United States Patent US 8,676,856 B2
Bruaset et al. Mar. 18, 2014

(54) INTERACTIVE RENDERING OF PHYSICAL ENTITIES

(75) Inventors: Are Magnus Bruaset, Oslo (NO); Christian Høstmark Tarrou, Oslo (NO); Trond Vidar Stensby, Oslo (NO); Jakob Skogseid, Oslo (NO)

(73) Assignee: Statoil Petroleum AS, Stavanger (NO)

( * ) Notice: Subject to any disclaimer, the term of this patent is extended or adjusted under 35 U.S.C. 154(b) by 125 days.

(21) Appl. No.: 13/057,971

(22) PCT Filed: Jul. 31, 2009

(86) PCT No.: PCT/GB2009/001888
§ 371 (c)(1),
(2), (4) Date: Jun. 6, 2011

(87) PCT Pub. No.: WO2010/015808
PCT Pub. Date: Feb. 11, 2010

(65) Prior Publication Data
US 2012/0117124 A1 May 10, 2012

(30) Foreign Application Priority Data

Aug. 6, 2008 (GB) .................................. 0814474.3

(51) Int. Cl.
*G06F 17/30* (2006.01)
(52) U.S. Cl.
USPC ........... 707/797; 707/778; 707/829; 709/203; 709/219
(58) Field of Classification Search
USPC .......... 707/778, 829, 797, 769, 776, 999.003, 707/999.01, 999.102, 999.107
See application file for complete search history.

(56) References Cited

U.S. PATENT DOCUMENTS 6,003,033 A 12/1999 Amano et al.
6,327,535 B1 12/2001 Evans et al.
(Continued)

FOREIGN PATENT DOCUMENTS

CA 2524527 4/2007
EP 1037143 9/2000
(Continued)

OTHER PUBLICATIONS

Clark et al., 4DPlates: On the fly visualization of multilayer geoscientific datasets in a plate tectonic environment, Mar. 28, 2012, Computer & Geosciences 45 (2012), pp. 46-51.*

(Continued)

*Primary Examiner* — Leslie Wong
(74) *Attorney, Agent, or Firm* — Patterson Thuente Pedersen, P.A.

(57) ABSTRACT

A method for generating a model of a physical entity, in particular the earth, using one or more hierarchically organized multi-resolutional data trees T, each data tree including a plurality of nodes $N_k$, each node having a grid with a fixed number of points, wherein each node can store an arbitrary number of data items, each holding scalar field values for each point in the grid, the method including the steps of creating a geometry using one or more data trees; and creating an associated overlay using one or more data trees, wherein at least one of the geometry and overlay includes a formula to be applied to data within one or more data trees. This enables manipulation of the data within the data trees during rendering and increases the adaptability of the model without an increase in the required memory space. In preferred embodiments the nodes of the data trees include time dependent geo-references to allow the data trees to be time rotated.

17 Claims, 14 Drawing Sheets

(56) References Cited

U.S. PATENT DOCUMENTS

| | | | |
|---|---|---|---|
| 6,789,054 B1 * | 9/2004 | Makhlouf | 703/6 |
| 8,018,458 B2 * | 9/2011 | Peterson | 345/428 |
| 2001/0039487 A1 | 11/2001 | Hammersley et al. | |
| 2003/0204478 A1 | 10/2003 | Le et al. | |
| 2004/0017385 A1 | 1/2004 | Cosman et al. | |
| 2005/0063596 A1 * | 3/2005 | Yomdin et al. | 382/232 |
| 2005/0131924 A1 * | 6/2005 | Jones | 707/100 |
| 2005/0243085 A1 | 11/2005 | Schechter et al. | |
| 2009/0282369 A1 * | 11/2009 | Jones | 715/848 |
| 2012/0001915 A1 * | 1/2012 | Peterson | 345/428 |

FOREIGN PATENT DOCUMENTS

| | | |
|---|---|---|
| JP | 2001306577 | 2/2001 |
| WO | WO 01/09841 A1 | 2/2001 |

OTHER PUBLICATIONS

Great Britain Search Report for Great Britain Application No. GB0814474.3 dated Dec. 5, 2008.

Great Britain Search Report for Great Britain Application No. GB0919554.6 dated Mar. 2, 2010.

Hwa et al., "Adaptive 4-8Texture Heirarchies", Apr. 2004. 8 pages.

Sahr et al., "Geodesic Discrete Global Grid Systems", Cartography and Geographic Information Science, vol. 30, No. 2. pp. 121-134. 2003.

Hwa et al., "Real-Time Optimal Adaptation for Plantary Geometry and Texture: 4-8 Tile Hierachies", IEEE Transactions on Visualization and Computer Graphics. vol. 11, No. 4. Jul./Aug. 2005.

Examination Report dated Feb. 7, 2012 for GB Application No. 0814474.3, 2 pages.

Examination Report dated Sep. 24, 2010 for GB Application No. 0919554.6, 3 pages.

* cited by examiner

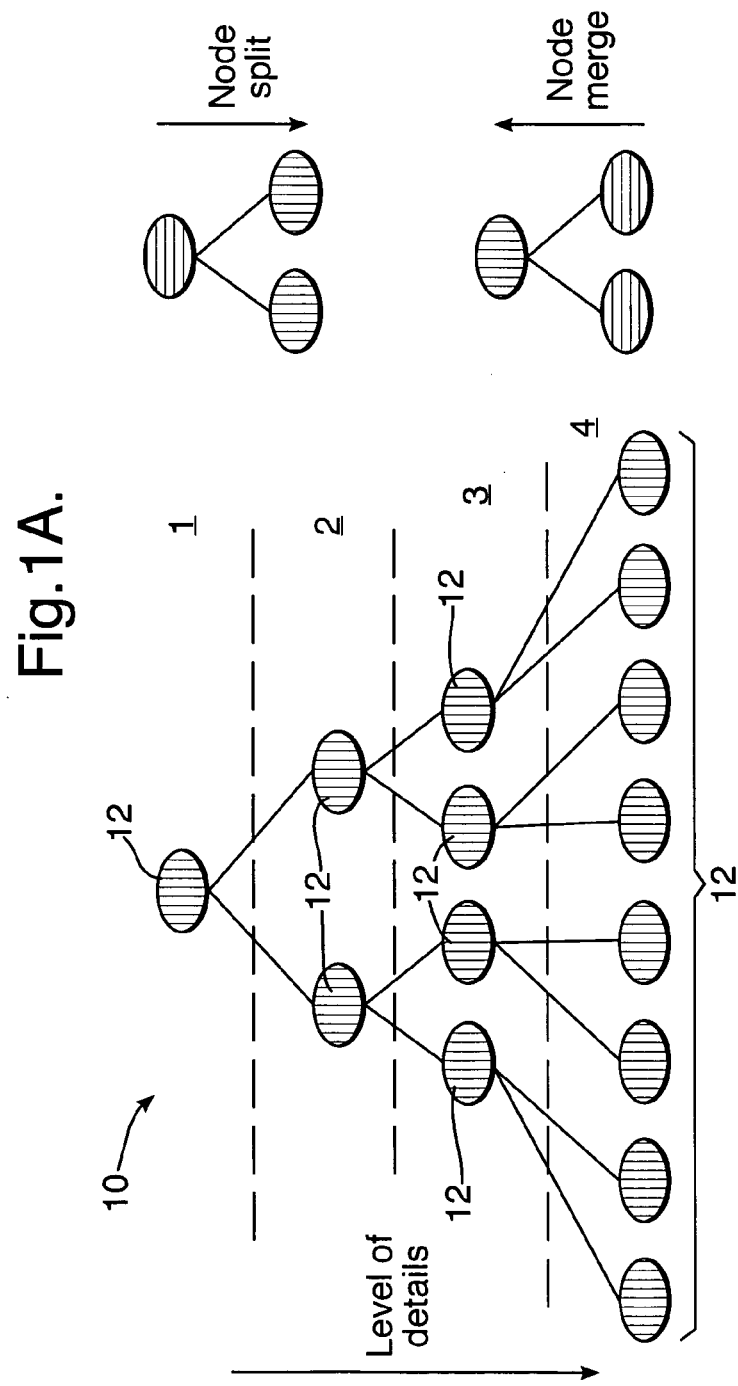

INTERACTIVE RENDERING OF PHYSICAL ENTITIES

PRIORITY CLAIM

The present application is a National Phase entry of PCT Application No. PCT/GB2009/001888, filed Jul. 31, 2009, which claims priority from Great Britain Application No. 0814474.3, filed Aug. 6, 2008, the disclosures of which are hereby incorporated by reference herein in their entirety.

FIELD OF THE INVENTION

This invention relates to the generation of a multilayered, multi-resolution model of a physical entity, in particular the earth's lithosphere, which retains full interactivity when rotated in time.

The ability to accurately model and visualize (render) the surface of the Earth is desirable in many fields. First, being able to view an accurate representation of the Earth enables a greater understanding of the geography and make up of our planet and hence has great educational benefits. Further, navigation systems require high resolution topographical data and location information in order to produce reliable results. Various 3-dimensional computer generated models of the earth's surface are already publicly available. A well-known example of this is Google Earth, which provides satellite imagery and aerial photography superimposed onto a globe template. This system is multi-resolutional in that the user can zoom into areas of interest, which results in higher resolution images being displayed. Similarly the user can zoom out to view coarser images of a larger area. The user can freely adjust the viewpoint whereupon the system calculates the changes to the viewed scene and renders an appropriately altered image.

Such visualization systems require a hierarchical data structure such that changes in resolution and view can be easily and quickly rendered.

One such hierarchical data structure is disclosed in "Adaptive 4-8 Texture Hierarchies" (Hwa et al., IEEE Visualization 2004). This paper describes a diamond tile structure, each tile comprising a regular grid. Each tile is linked to one or more parent (larger) and child (smaller) tiles. Typically each tile will have two parent tiles and four child tiles. Data from a smaller tile can be mapped to its parent via low pass filtering. In this way high resolution data can be stored within smaller, child tiles and progressively coarser resolutions are achieved by merging and filtering the data on to larger parent or higher ancestor tiles. The displayed tiles are linked by Sierpinski indices to allow for traversal of the tiles in an ordered manner.

This type of data structure allows the creation of a model in which it is possible to move from finer to coarser resolution by merging data tiles and from coarser to finer resolution by splitting the data tiles, i.e. moving from a tile to its parent tile or child tile respectively. Sierpinski indices, or another iterator mechanism, allow for the selected data tiles to be traversed in an ordered manner.

The above document is concerned with creating surfaces with a planar base (2Vz D), however a later paper by the same authors, "Real-Time Optimal Adaptation for Planetary Geometry and Texture: 4-8 Tile Hierarchies" (IEEE Visualization 2005), describes how this tile structure can be mapped to a sphere with a cubic base (3D) as well as polygonal meshes with non-quadrilateral faces.

As described in "Geodesic Discrete Global Grid Systems" (Sahr et al Cartography and Geographic Information Science, Vol 30, No. 2, 2003), numerous global grid systems are known, including those based on a cubic base structure. However, of these systems, those based on the icosahedron have proved most popular. This is due to the fact that the icosahedron has the smallest face size of the platonic solids and therefore results in the smallest distortion when transforming between the face of the icosahedron and the corresponding spherical surface.

Various methods are known for mapping data onto such global grid systems. In general data structures suitable for mapping to global grid systems can be thought of as data trees having a plurality of nodes, where each node in the tree represents a local patch of information. These nodes are split into different levels and the deeper the level of node the higher the data resolution, i.e. a smaller physical domain is represented by the node. The hierarchical tile structure of Hwa can be seen to form a data tree, wherein each tile corresponds to a node of the data tree. In order to link these data trees to a global grid system, each node of the data tree is provided with a geo reference. This links each node with a location on the global grid system and can take the form of a latitude-longitude reference, UTM zone, mercator or other known global locator.

Global models can therefore be built by first creating one or more data trees containing information, for example satellite images, which is linked to specific locations on the globe. Such data trees are stored in computer hardware, for example a server or computer hard drive. When it is desired to view this data, the stored data trees are used by viewing software to generate a three dimensional model of the globe, onto which the information contained in the nodes is displayed.

Such models are formed of two components—a geometry and overlay. The geometry creates the underlying structure of the model, i.e. a surface, while the overlay provides the color/texture displayed on this surface. A single data tree can be used to provide both the geometry and the overlay. For example, a data tree containing height values can be used to create a geometry in which the z values are set by the height values contained in the nodes. This results in a surface which displays the height values in relief. The same data can also create an overlay, in which the different height values equate to different colors. In this way the topography of the earth is displayed both by changes in the surface of the model and color differences.

Alternatively different data trees can be used to generate the geometry and overlay, or different data within the same data tree can be used for geometry and overlay creation. For example, the geometry could be selected to show the heights of each data point while the overlay could represent the temperature of each point. The viewing software therefore creates a model of the earth based on predefined or user selected geometry and overlay preferences which are applied to stored data trees. The model can then be viewed from different angles by traversal of the nodes and the resolution altered by splitting or merging the nodes as the user zooms into or out of the selected scene.

As described above, it is possible to visualize more than one form of information through selected use of geometry and overlay. However, this can be confusing to the viewer and in addition variations in surface height (geometry) are often difficult to pick up unless a high resolution is used or the changes in height are dramatic. It is therefore often desirable to display more than one form of information as overlay. For example, the Google Earth™ mapping service allows various additional information, such as state boundaries or road maps, to be superimposed onto the base satellite image. This is achieved by creating additional data trees containing this further information and generating a new geometry layer on which this information can be displayed as overlay. In effect therefore, two separate "models" are created which are independent of each other but aligned as both are based on geographic location. Each combination of geometry and overlay is therefore said to form a layer in the model and these are navigated in combination.

SUMMARY OF THE INVENTION

This form of model rendering can also be applied outside the field of global imaging. Data trees can be complied which map the properties of any physical entity (for example, a car) and project these onto a suitably shaped base. All that is required is a suitable location marker (i.e. geo-reference) for linking each node with a point on the base model. Layers of geometry and overlay can then be created as described.

As well as providing benefits in the fields of education, mapping and navigation, the inventors of the present invention have realized that global modelling can also have uses in relation to sub-surface mapping. This has particular benefits in the field of mining, in which the location of natural resources such as oil, coal, gas etc and the structure of intervening rock formations is of great importance. During exploration and drilling much data is collected on the location and properties of local rock strata. Seismic data as well as magnetic and gyroscopic readings are used to estimate the depths and composition of subsurface strata. However, there is currently no simple model structure allowing easy comparison of different sites of interest.

One embodiment of the present invention provides a method of modelling the Earth's lithosphere comprising; creating a plurality of hierarchically organized multi-resolutional data trees, said trees each comprising a plurality of nodes, each node having a grid with a fixed number of points with which data is associated, wherein at least one tree contains data relating to subsurface locations; storing said plurality of data trees; and rendering a multilayered model of the Earth wherein the geometry and overlay of each layer contain data from at least one of said plurality of data trees, and wherein at least one layer contains information relating to a subsurface location.

By "hierarchically organized multi-resolutional data tree" it is meant a data structure of the type described above, wherein nodes represent local patches of information defined on a fixed size grid and are hierarchically arranged such that deeper level nodes represent smaller physical domains at higher resolutions and higher level nodes represent larger physical domains at lower resolution. An example of this type of data tree is described in the above referenced papers by Hwa et al., incorporated herein by reference.

In this way it is possible to improve visualization of subsurface terrain. Using this method a layer showing the Earth's surface can be shown together with one or more layers of subsurface strata. Compiling this data in a global model will result in a greater understanding of the lithosphere and can assist in estimating subsurface structure in as yet uncharted areas.

One embodiment of a system for implementing this method may comprise a builder, for creating the plurality of data trees, a memory, for storing the data trees, and a processor for rendering the model using said data trees. One or more of these components may be found within a single apparatus or may be separate apparatus connected via a communications system, such as the interne. A building method may comprise creating a plurality of hierarchically organized multi-resolutional data trees, said trees each comprising a plurality of nodes, each node having a grid with a fixed number of points to which data is associated, wherein at least one tree contains data relating to subsurface locations; and storing said plurality of data trees or transmitting said plurality of data trees. The transmission step could occur instead of the storage step if the data trees are to be stored by a separate database component. A viewing method may comprise obtaining a plurality of data trees; and rendering a multilayered model of the Earth wherein the geometry and overlay of each layer contain data from at least one of said plurality of data trees, and wherein at least one layer contains information relating to a subsurface location. The method may also include displaying the rendered model, storing this or transmitting it to a remote location, such as a printer. While this provides a new use for current visualization technology, such systems are not without disadvantages. When new data is received into the system, this must first be processed in order to produce the correct data structure (i.e. data trees) for manipulation by the viewing software. Further, any manipulation of the existing data must be provided for in this initial processing (building) stage. For example, if a data tree has been built which includes detailed information on topography, but with limited information on sea depth, and another data tree contains detailed bathymetric data, it will not be possible to combine both sets of data in the geometry or overlay of a layer unless a new data tree is built which combines this information.

As a further example specific to the field of subsurface mapping, if two data trees have been produced which relate to the depth of two neighboring geological surfaces and it is desired to display the thickness of the rock strata between these, the thickness at each point must first be calculated and then a new data tree must be built in which this information is contained. This new data tree can then be used as either the geometry or overlay of a layer.

Consequently, the creation of a large database of data trees is required, taking up a large amount of memory space. In addition, when a user is operating the modelling system and desires to combine or alter data in existing data trees, a suitable data tree must first be built before this can be incorporated into the model. This reduces the adaptability and interactivity of the system. In addition it will often be the case that a large number of data trees must be used by the viewing software at one time, thus reducing the rendering speed of the system.

These disadvantages affect all rendering methods not simply those concerning geological subsurface models.

In order to overcome these difficulties, the present invention includes a new rendering method which enables adjustments and manipulations to be made to the data during rendering, without the need for additional processing during the data tree building stage.

One embodiment of the present invention comprises a method for generating a model of a physical entity using one or more hierarchically organized multi-resolutional data trees T, each data tree comprising a plurality of nodes $N_k$, each node having a grid with a fixed number of points to which data is associated, the method comprising the steps of creating a geometry using one or more data trees; and creating an overlay using one or more data trees, wherein at least one of the geometry and overlay comprises a formula to be applied to data within one or more data trees.

Therefore, in an embodiment, alterations can be made to the data without requiring the compilation of any additional data trees. Instead alterations to the data can occur during the geometry and overlay creation. Moving the manipulation of data to the rendering process, as opposed to requiring an initial building and storage step reduces the memory space necessary (as fewer data trees are required) and furthermore increases the adaptability of the system. Using the same base number of data trees the method of the present invention can generate many alternative renderings not possible using prior art methods.

According to this method, the geometry and/or overlay comprises a formula to be applied to data within one or more data trees. Shown mathematically, the method preferably requires that either the geometry comprises the formula $F_G(\hat{T}_1, \ldots, \hat{T}_m; \alpha_1, \ldots, \alpha_r)$ where $\hat{T} = \{\hat{T}_j\}_j \subset T$, and $\{\alpha_j\}$ are real-valued parameters, and/or that the overlay comprises the formula $F_O(\hat{T}_1, \ldots, \hat{T}_n; \beta_1, \ldots, \beta_s)$ where $\hat{T} = \{\hat{T}_j\}_j \subset T$, and $\{\beta_j\}_j$ are real-valued parameters.

In an embodiment of the present invention the geometry or overlay can combine data found within different data trees by way of an arithmetic function, for example by adding or subtracting two sets of data. Alternatively, the chosen formula could replace the values within one data tree with values from another under certain specified circumstances. For example, topographical data could be combined with bathymetric data by creating a formula which replaced grid point values within the topographical data tree with those from the bathymetric data tree whenever the topographical data contained a value of less than 0. The geometry or overlay, whichever contains this replacement formula, can then display both topographical and bathymetric data within a single layer. If this information is contained in the geometry of the layer this can be shown by changes in the surface elevation, whereas if it is the overlay which contains this formula the height and water depth information can be displayed through coloring or texture. It is also possible for both the geometry and overlay to comprise the same formula such that the height and depth is displayed both by changes in height and coloring.

Geometry and overlay formulas can also be used to create layers containing higher resolution "patches." For example, it will often be the case that areas of interest, e.g. the North Sea oil fields, will be mapped in greater detail than other, less important areas. A general global data set can therefore be enhanced in these areas by creating a formula which replaces the data values relating to specific locations with the equivalent data values contained in a separate data tree in which higher resolution detail is stored.

As an example of an arithmetical formula, in the situation where two data trees have been complied which relate to the depths of different geological surfaces, Ti and $T_j$, an overlay (or alternatively, geometry) can be provided to show the thickness of the rock strata between these two depths by using the formula $F_G = Tj - T_i$.

The formula can be predefined or can be created by the user prior to running the method.

One embodiment of the method includes the step of rendering the model, which can be a model of the earth. The method can then display the rendered model, store the rendered model or transmit the rendered model, for example to a remote location or to a printer.

The means by which data is associated with the grid points of each node will depend on the data structure chosen. However, in embodiments of the invention each node of the one or more data trees can store an arbitrary number of data items, each holding scalar field values for each point in the grid. In this way a single data tree can store a plurality of types of data for each grid point.

One embodiment of the present invention comprises a method for rendering a model of a physical entity for a view V, using one or more hierarchically organized multi-resolutional data trees T, each data tree comprising a plurality of nodes $N_k$, each node having a grid with a fixed number of points with which data is associated, the method comprising the steps of; a) for given view V evaluating a criterion for the selection of the level of detail for the nodes $N_k$; b) traversing all nodes $N_k$ in T, conducting split and merge operations where necessary until the selected level of detail is achieved, thus creating a set of nodes $T_E$ enabled for visualization; for all nodes $N_k$ in $T_E$, c) obtaining data if necessary, d) raising an update flag in all altered nodes $N_k$; for all nodes $N_k$ in $T_E$ which require updating e) creating geometry G; f) creating overlay O; and g) rendering all nodes in $T_E$, wherein at least one of the geometry and overlay comprises a formula to be applied to data within one or more of data trees T. The method can include a method of rendering a model of the Earth. The formula of the geometry and/or overlay can comprise any of the features listed above.

When the method is to be implemented, the user first decides what layers they wish to visualize. This includes the selection of the desired geometry and overlay and results in the selection of the one or more data trees T required to generate the layer(s). When first running the method an initial viewpoint may be predetermined, or the selected layer may have an associated start view. Alternatively the user may select a location and elevation from which they wish the rendered scene to be viewed. Based on this selected or predefined view V, the method then evaluates the necessary level of detail required. For example, at locations close to the viewpoint a higher resolution, and therefore deeper level nodes, will be required whereas at positions remote from the viewpoint less detail will be necessary and therefore higher level nodes can be used. The nodes are then traversed and the selected level of detail compared with these. During this step the splitting and merging of nodes can occur until the correct level of detail is achieved. In some embodiments this step of splitting or merging of nodes can only move one level down or up the hierarchical data tree structure. If there is a need for split or merge operations covering a distance of more than one level, a repetition of the traversal is needed. Therefore step b) may require multiple traversals until the correct level of detail is achieved across the layer.

Once the correct level of detail has been determined across the layer the resulting set of nodes $T_E$, which will form the visualized surface of the layer, are said to be "enabled for visualization" and the method proceeds to the next step. At this stage, if necessary, the data relating to the enabled nodes is obtained. This step relates to the fact that, in embodiments a large number of data trees can be accessible to the user which are stored in one or more central storage databases. Of this complete set, D, only a limited set of data trees, T, will be required for any particular visualization and hence only the required data trees are uploaded to the memory of the user's computer. In some embodiments it is possible that only those nodes of a data tree necessary for a particular visualization are uploaded. Changes in the layer to be viewed, or the addition of a new layer, can result in the need to obtain the new data from the storage database. Therefore, upon the initial rendering, and during any later changes to viewpoint or layer composition, data may need to be uploaded in relation to the enabled nodes. However, this step is optional as in some embodiments of the method all the relevant data will already be stored within a computer which is implementing the method. In such circumstances it is not necessary to obtain any data at step c) and hence the method moves straight to step d).

The method then raises an update flag for all altered nodes. Therefore, during initial rendering all nodes will require updating, whereas in later visualizations during the on-going operation of the method nodes which have not been altered, e.g. through splitting, merging or changes in geometry and overlay, will not need to be re-rendered. In relation to this step, alteration of the nodes is measured in relation only to the rendering of the model immediately prior to the current rendering. Put another way, all nodes affected by a changed state of the model, e.g. in response to user interactions, will have an update flag raised against them.

The above described steps of the method concern the selection of the nodes within the data tree(s) required to render the selected layer, or layers, at a given viewpoint. The method then applies geometry and overlay procedures to the enabled nodes in order to create the geometry and overlay and thus create the layer structure and associated imagery. Unlike prior art methods, the method of the present invention allows the geometry and overlay to combine data from various data trees through the use of formulae.

One embodiment of the method can comprise the use of a plurality of geometries and overlays. If it is desired to view a plurality of layers this can include the selection of a geometry and overlay pair for each layer.

The rendering step can result in further visual effects being applied to the layer, such as offset between layers and scale to emphasise any surface elevation, i.e. if the geometry comprises z values taken from data within the data tree. In addition, the rendering step can include setting material properties for the layer to alter its visual appearance.

In one embodiment the method comprises the further step of h) displaying the rendered nodes. In some cases this step can include the transmission of the image (rendered nodes) to a remote display. However in most cases the computer on which the method is implemented will comprise a display unit on which the image can be shown. In some embodiments step h) can additionally or alternatively comprise storing the rendered nodes and/or printing the rendered nodes.

One embodiment of the method comprises the further step of i) returning to step a). Although it is possible for the method to be continuously repeated during use, preferably step i) is triggered by a change in view V, geometry G or overlay O. These changes can be caused by user action. For example, the user can decide to zoom into the image or alter the viewing orientation. This causes a change in view V. Alternatively the user can add or remove a layer from the visualization, which can affect the geometry and overlay (as each layer is formed of a geometry/overlay pairing). In this way the method forms an event loop and prevents unnecessary processing during periods in which no alterations are made to the rendered view.

The invention extends to computer software having computer executable instructions adapted to configure data processing means to carry out the above described method, and to computer readable medium on which this software is provided. The software can be provided on a physical carrier such as a DVD, CD-ROM, solid state memory device, or as a signal from a remote location, such as a download over the internet.

In one embodiment the present invention provides an apparatus arranged to carry out this method.

In other words, an embodiment of the present invention provides a data processing apparatus configured to generate a model of a physical entity using one or more hierarchically organized multi-resolutional data trees T, each data tree comprising a plurality of nodes $N_k$, each node having a grid with a fixed number of points to which data is associated, the apparatus comprising a processor arranged to create a geometry using one or more data trees; and create an associated overlay using one or more data trees, wherein at least one of the geometry and overlay comprises a formula to be applied to data within one or more data trees.

Embodiments the data processing apparatus can be configured to render a model of a physical entity for a view V, using one or more hierarchically organized multi-resolutional data trees T, each data tree comprising a plurality of nodes $N_k$, each node having a grid with a fixed number of points to which data is associated, the apparatus comprising a processor arranged to evaluate a criterion for the selection of the level of detail for the nodes $N_k$, traverse all nodes $N_k$ in T until there is no need for split or merge operations thus creating a set of nodes $T_E$ enabled for visualization; for all nodes $N_k$ in $T_E$, obtain data if necessary and raise an update flag in all altered nodes $N_k$, for all nodes $N_k$ in $T_E$ which require updating create geometry, G; create overlay, O; and render all nodes in $T_E$, wherein at least one of the geometry and overlay comprises a formula to be applied to data within one or more of data trees T. The apparatus can further comprise a display arranged to display the rendered nodes.

In one embodiment the apparatus further comprises a memory for storing a plurality of formulae for selection by the user. These formulae can comprise predefined formulae (i.e: installed on the apparatus together with the modelling software), or formulae created by the user, or both. This memory can additionally or alternatively be arranged to store the rendered nodes.

In another embodiment the apparatus further comprises a transmitter for sending a request for data to an external device, such as a central server, and a receiver for receiving the requested data. This enables the apparatus to access data trees stored on other devices and allows a number of separate apparatus to access a central server or database, or each other, for access to a larger number of data trees than can be stored within individual apparatus. This reduces the memory requirements of the data processing apparatus.

In one embodiment the transmitter is further arranged to transmit data to an external device. This enables the apparatus to send newly created formulae or data trees to a central storage unit or other data processing apparatus, such that this data can be accessed and used by other apparatus. In addition the transmitter can be capable of transmitting the rendered nodes for display by a separate apparatus.

For the reasons discussed above, it is desirable for a large number of data trees to be stored in a separate device to the apparatus of the present invention. Therefore, the apparatus can be connected to a storage device in which a plurality of hierarchically organized, multi-resolutional data trees are stored. The data processing apparatus and storage device can form part of a network comprising one or more further data processing apparatus, wherein the storage device can, upon request, transmit data trees to the apparatus. The network may also comprise additional storage devices.

A desirable feature in relation to geological modelling is the ability to reconstruct changes in the Earth's crust over time.

Over geological time (millions of years), the tectonic plates of the Earth's crust have moved around, with new areas of crust being created and other areas being subducted. The past movement of tectonic plates and their projected future movements are the subject of much academic research. By studying gravity and magnetic anomalies, isobaths, fracture zones etc. it is possible to determine or estimate the relative positions of the major tectonic plates back through many millions of years. The movement of the tectonic plates can be applied to models of the earth via rotation models. These are tables, or graphs, which plot the movement of the plates over time using a euler pole and the rotation angle between the present day and past plate position. This information can also be provided in the form of rotation matrices. By applying a chosen rotation model or matrix to the co-ordinates of the vertices of a plate, this can be rotated back in time in relation to a blank global grid or to another plate. Further information on this subject can be found in "Plate Tectonic Modelling: Tools and Methods" (A. Schettino, <http://www.serg.unicam.it/Tutorial.html>).

However, previously it has not been possible to interactively rotate grid based data such as data trees in this way. By "interactively" it is meant that the method responds at a satisfactory speed to user input to render the scene in "real time." Hence, in real time rendering it has only been possible to rotate images of the plates or their polygonal outlines through time and not data embedded within grids relating to the physical properties of the plates.

Embodiments of the present invention provides systems, methods, and a data structure which enables time rotation of grid based data.

In one embodiment of the present invention there is provided a method of creating a hierarchical data tree, comprising the steps of: obtaining a set of data relating to known geographical locations; arranging said data into at least one hierarchically organized multi-resolutional data tree, said tree comprising a plurality of nodes, each node having a grid with a fixed number of points to which data is associated, and a geo-reference that locates the grid in physical space, wherein the geo-reference of each node is time dependent.

Embodiments of the invention further extend to an apparatus arranged to carry out this method. In other words the invention provides a data conversion apparatus comprising a receiver for receiving a set of data relating to known geographical locations; a processor for arranging said data into at least one hierarchically organized multi-resolutional data tree, said tree comprising a plurality of nodes, each node having a grid with a fixed number of points to which data is associated and a geo-reference that locates the grid in physical space, wherein the geo-reference of each node is time dependent.

By "time dependent geo-reference" it is meant a geo-reference which can change with time without corruption of the data contained in the grid structure of the nodes.

Embodiments of the present invention that include the creation of this type of geo-reference enable the grid based data within each node to be rotated through time. This has many benefits in terms of allowing data manipulation within the time rotated model. Such manipulation is not possible in prior art rotation methods in which a simple polygon (tectonic plate) image is time-rotated.

The raw data can be transmitted to the apparatus from an external source, for example by internet or intranet connections, or via a physical carrier such as a DVD or memory stick. The data could be any data representative of properties of the Earth's lithosphere. For example, the data could contain seismic readings, satellite images, temperature readings, topographical or bathymetric information.

Further the obtained data could be in the form of a hierarchically organized multi-resolutional data tree and the method may arrange this data into a different data tree or plurality of data trees. For example, a data tree containing global information could be used by the method to create a plurality of smaller data trees, each relating only to one tectonic plate, or vice versa.

The resulting data tree could be global, i.e., it could contain information relating to the entire surface, or a sub-surface, of the Earth, or regional in extent. The size of the data tree will depend on the amount and geographical coverage of the obtained data. Further the data tree can contain data from a plurality of sources. Therefore a single data tree may contain, for example, regional information relating to several different locations, the data from each location having been obtained separately and combined within a single data tree.

Regardless of the size, geographical extent and type of raw data used, the data trees created by the method and apparatus contain time dependent geo-references, that will enable the data within the nodes to be time-rotated.

The method can use the created data tree(s) to render a model of the Earth according to known methods, or preferably according to the above described method of the present invention.

In practice it is desirable to separate the functions of building the data trees and rendering images based on these trees. This is so that, as discussed above, a central storage database can be set up to process and prepare data trees for future use by a number of remote data processing apparatus. These apparatus can access the central storage device in order to obtain one or more data trees for rendering models. In this way a single collection of data trees can be used by a plurality of separate apparatus for creating and rendering models.

In one embodiment the method comprises the further step of storing said at least one data tree. The apparatus therefore preferably comprises a memory for storing said at least one data tree.

The method can further comprise the steps of receiving a request for access to one or more data tree; and transmitting the requested data trees. This allows the created data trees to be used by a number of different users. Storing the created data trees centrally reduces the amount of memory space necessary for running the system on third party computers.

The data conversion apparatus can form the storage device to which the one or more data processing apparatus are connected.

Following the creation of data trees comprising time dependent geo-references, methods can be created in which the grid based data within these trees is interactively rotated through time.

One embodiment of the present invention comprises a method for rotating grid based data through time in accordance with a predefined rotation model or matrix comprising the steps of obtaining at least one hierarchically organized multi-resolutional data tree, said tree comprising a plurality of nodes, each node having a grid with a fixed number of points to which data is associated and a time dependent geo reference that locates the grid in physical space; applying the rotation matrix to each time dependent geo reference within the at least one data tree. The method can further comprise the step of storing the resulting at least one time rotated data tree.

Alternatively, rather than storing the time rotated data tree, the method can instead include the step of rendering the time rotated data tree. This step could also be included in addition to the storing stop. In addition the time rotated data tree (or rendered tree) can be transmitted to a remote device, such as a storage device. In embodiments in which the time rotated data tree is rendered this could then be displayed.

Embodiments of the invention include an apparatus arranged or configured to carry out this method.

In other words, an embodiment includes a data processing apparatus comprising a receiver for receiving at least one hierarchically organized multi-resolutional data tree, said tree comprising a plurality of nodes, each node having a grid with a fixed number of points to which data is associated and a time dependent geo reference that locates the grid in physical space; and a processor arranged to apply a predefined rotation model or matrix to each time dependent geo reference within the at least one data tree.

The apparatus can further comprise a memory for storing the resulting at least one time rotated data tree.

The processor can be arranged to render the time rotated data tree and the apparatus can further comprise a display for displaying the rendered data.

Rendering can be achieved according to known rendering methods.

In one embodiment the at least one time rotated data tree is rendered according to the above described method of the present invention. In such an embodiment therefore, the method is applied to one or more data trees comprising a time dependent geo-reference and includes the initial step of applying a pre-defined rotation matrix to each time dependent geo-reference within the at least one data tree to create a time rotated data tree T' comprising a plurality of nodes $N'_k$, and the remaining steps are conducted on the nodes $N'_k$ of time rotated data trees T'.

In other words, an embodiment of the present invention can comprise a method for rendering a model of the earth for a view V and rotation matrix, using one or more hierarchically organized multi resolutional data tree T, each data tree comprising a plurality of nodes $N_k$ with a time dependent geo-reference, the method comprising the steps of applying the pre-defined rotation matrix to each time dependent geo reference within the at least one data tree to create at least one time rotated data tree T' comprising a plurality of nodes $N'_k$, for the given view V, evaluating a criterion for the selection of the level of detail for the nodes $N'_k$; traversing all nodes $N'_k$ in T', conducting split and merge operations where necessary until the selected level of detail is achieved, thus creating a set of nodes $T'_E$ enabled for visualization; for all nodes $N'_k$ in $T'_E$, obtaining data if necessary, raising an update flag in all altered nodes $N'_k$ for all nodes $N'_k$ in $T'_E$ which require updating, creating geometry G; creating overlay O; and rendering all nodes in $T'_E$, wherein at least one of the geometry and overlay comprises a formula to be applied to data within one or more time rotated data trees T'.

In this way therefore, the geometry and overlay can manipulate data within the time rotated data trees.

This provides a mechanism for adjusting the data contained in the nodes based on the age of the rotated earth model.

Therefore, the formula to be applied to the data is a function of time rotation. In this way, the effect of the formula on the data is dependent on the time being rendered.

For example, if a data tree contains information on the height of a particular region, the geometry or overlay formula can adjust these height values based on the amount of time rotation which has occurred.

For instance, in areas of sea floor spreading the newly formed crust cools and sinks over time. Therefore, the geometry or overlay may include a formula which increases the height values of a particular data tree based on the amount of time rotation which has occurred. Alternatively, an area known to be undergoing uplift may have a geometry, overlay, or both applied to it which decreases the height values as a function of rotated time.

In order to achieve these differing effects, the data relating to each area can be contained in different data trees, such that different geometry/overlay formula are applied to these trees. Alternatively a single data tree could be employed together with a more complex geometry/overlay formula.

In a similar way, calculations concerning past temperatures and water depths, or any other variable, can be conducted on time rotated gridded data.

In one embodiment, the data stored within at least one data tree includes at least one value representing the age of the data points. In some situations a single age might be set for an entire layer. For example, a data tree containing the topography of the world today could have the age zero attached to it. Similarly, if a data tree is constructed in which the topography of the Earth 50-million years ago (ma) has been estimated a single age of 50 can be attached to the whole data tree. Alternatively, a data tree can be created which contains more detailed age information, for example, grid points relating to different locations on the sea floor can have different age values to take account of sea floor spreading. Equally the rocks of the continents have varying ages (e.g. the surface geology of the British Isles varies. greatly from the oldest rocks in north west Scotland to the youngest in south east England) and this can also be represented within the node grids.

The age associated with a particular data tree or data point could be an "age of appearance," i.e. when the rock was formed or surfaced, or an "age of disappearance," i.e. when a rock was subducted or covered by a different rock layer.

Providing information relating to the age of various geographical locations, or attaching an age to data trees, enables the formulas used in relation to the geometry and/or overlay to adjust the data within the data trees according to the age of the data as well as the time being rendered.

The calculations which can be carried out on the time rotated data will depend on the data which is contained within the data trees and the ability of the user to create suitable formulae. However, the method of the present invention provides a model framework which allows these calculations to occur. No "on the fly" manipulation of grid based data is possible according to prior art rendering methods due to the inability to use formula within the geometry and overlay or to time rotate grid based data. These two features allow a greater degree of data handling by the rendering method, increasing the variations in model generation and rendering which can be achieved for a given number of data trees. In addition the speed of rendering is increased, allowing interactive time rotation.

Another embodiment of the present invention includes the ability to alter the appearance of data within the rendered model based on its age. Due to the creation of new crust over time, for example sea floor spreading, when the present tectonic plates are rotated in time, it is often the case that areas of these plates are not present at the past time being visualized. Alternatively in areas of subduction areas of plate that are not visible at the present time can be visible at a past time.

Therefore, in an embodiment the pre-defined overlay is arranged to mask those data points having an age less or greater than that of the time being rendered.

This improves the visualization of the model by preventing visual overlap of tectonic plates, or gaps between tectonic plates, and hence the ease with which the display can be understood by the user is increased.

For example, in the case of sea floor spreading a data tree may be provided including a scalar field of "age of appearance" for sections of crust. The crust can then be masked if the age of appearance of the data point is less than the geological time being visualized. Alternatively, in subduction zones the data tree may contain information on the "age of disappearance" of the crust. Areas of crust will then be masked if the age of disappearance of the crust is greater than the geological time being rendered. Whether the overlay is set to mask data points with an age greater than or less than the time being rendered will depend on the desired effect but also on the notation used for geological time. In the above examples, despite the rendered time occurring in the past, this time is made positive (20 ma, t'=20) whereas in other embodiments the method may provide past ages in the negative (20 ma, t'=-20). This latter notation is more likely to be used in situations in which the model is designed for also rendering future ages.

In the above discussed embodiments of the rendering method a predetermined rotation matrix is applied to the data trees. However, in another embodiment of the present invention, the rendering method can compute the required rotation matrix. Using known rotation models and a user inputted desired time, t', to which it is desired to rotate the model, the method can calculate the rotation matrix necessary to rotate the data tree(s) to this time.

Therefore, the method further can comprise the initial steps of, receiving desired time t' for which model is to be rendered; computing the required rotation matrix based on a pre-defined rotation model evaluated at time t'; applying the computed rotation matrix to all nodes $N_k$ in the one or more data trees T, to create one or more time rotated data trees T' comprising a plurality of nodes $N'_k$; whereupon the remaining steps are conducted on the nodes $N'_k$ of the one or more time rotated data trees T'.

In embodiments of the rendering method in which time rotation occurs, step i) may additionally be triggered by a change in time t' or an alteration in the rotation model or matrix used.

In one embodiment, the invention includes a method for rendering a model of the earth for view V, at time t', using one or more hierarchically organized multi-resolutional data trees T, each data tree comprising a plurality of nodes $N_k$, each node having a grid with a fixed number of points to which data is associated and a time dependent geo-reference, the method comprising the steps of a) computing the required rotation matrix based on a pre-defined rotation model evaluated at time t'; b) applying the computed rotation matrix to the time dependent geo-references of all nodes $N_k$ in the one or more data trees T, resulting in one or more time rotated trees T', comprising transformed nodes $N'_k$; c) for the given view V evaluating a criterion for the selection of the level of detail for the nodes $N'_k$; d) traversing all nodes $N'_k$ in conducting split or merge operations where necessary until the selected level of detail is achieved, thus creating a set of nodes $T'_{iE}$ enabled for visualization; for all nodes $N'_k$ in $T'_{iE}$ e) loading data if necessary; f) raising an update flag in all altered nodes $N^{\wedge}$; for all nodes $N'_k$ in $T'_{iE}$ which require updating f) creating geometry G by; g) creating overlay O and h) rendering all nodes in $T'_{iE}$.

This high level algorithm enables time rotation, formula based geometry/overlay, age masking etc. to be conducted by the rendering software. This allows calculations to be conducted "on the fly," during rendering, without the need for pre-processing other than to create the initial data trees. Each of the above operations (time rotation, masking etc) can be introduced into this method as desired.

For example, when it is desired to view the model in the present time (t'=0), the method can calculate an identity matrix I for the rotation matrix. Therefore, no adjustment will be made to geo-references of the data trees T and the remainder of the method steps will be conducted on nodes $N_k$. However, the method still contains the framework for time rotation and therefore this can be applied as soon as this is desired by the user. At this point the user can simply specify a new time t' and the method can compute the required rotation matrix without need to involve an additional method.

Similarly the geometry and overlay can comprise a formula to be applied to data trees T (or T'). This may involve altering the data displayed according to changes time being rendered or age masking as discussed above.

In one embodiment the method further comprises the step of i) displaying the rendered nodes. The method may also store and/or transmit the rendered nodes.

Preferably the method is embedded in an event handling mechanism (event loop) such that the method is run on demand, e.g. in response to changes in view V, time t', geometry G or overlay O.

In one embodiment the method is carried out asynchronously, such that certain steps of the method are carried out in a first thread and the remaining steps in a secondary thread. In this way, computationally intensive steps can be outsourced to the secondary thread and hence do not interrupt the rendering.

Embodiments of the invention can include computer software having computer executable instructions adapted to configure data processing means to carry out the above described methods, and to computer readable medium on which said software is provided. The software may be provided on a physical carrier such as a DVD, CD-ROM, solid state memory device, or as a signal from a remote location, such as a download over the internet.

Embodiments of the invention further include a data processing apparatus configured to carry out the above preferred methods.

Using the methods of the present invention, a fully interactive time rotatable model of the Earth can be visualized at any point in time. Further, the data found within the node grids can be manipulated during the rendering process, to show projected changes in the data with time, to combine or replace data within various data trees or to mask data not relevant to the viewed time period.

One use of the method and apparatus of the present invention is to carry out initial investigations into the location of sub surface natural resources, such as oil, gas, coal, precious gems etc. This can be achieved by rotating grid based data back in time, discovering the past conditions in areas where natural resources are known to occur, and looking for other areas in which similar conditions are found. The model can then be returned to the present day and the current location of the potential resources discovered. Such a system could potentially save vast amounts of time, manpower and money by more accurately locating natural resources before physical exploration begins.

BRIEF DESCRIPTION OF THE DRAWINGS

The embodiments of the present invention may be more completely understood in consideration of the following detailed description of various embodiments of the invention in connection with the accompanying drawings, in which:

FIG. 1A shows a schematic representation of a hierarchically organized multi-resolutional data tree;

DETAILED DESCRIPTION OF THE DRAWINGS

Figure 1B:
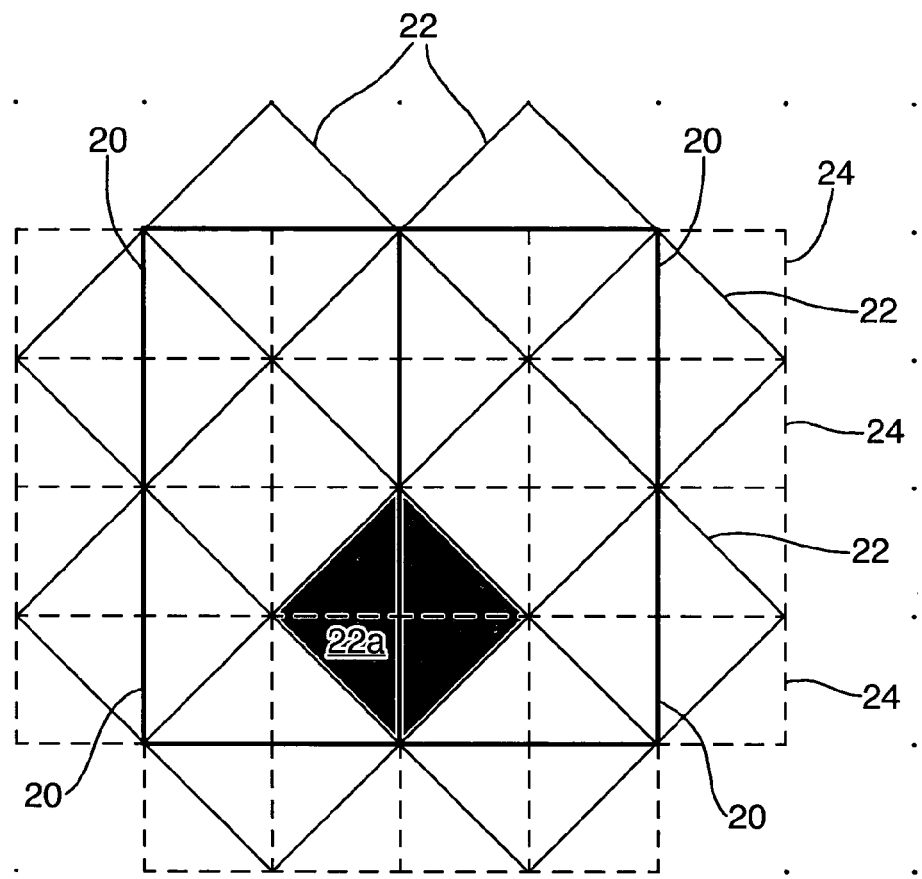
FIG. 1B shows an example of a hierarchical tile data structure which can form the data tree of Fig 1A.

The modelling system of an embodiment of the present invention includes the use of hierarchically organized multi-resolutional data trees. An exemplary data structure is schematically shown in FIG. 1A. Each data tree 10 comprises a plurality of nodes 12. Each node 12 includes a grid with a fixed number of points. The nodes 12 are capable of storing an arbitrary number of data items, each holding scalar field values for each point in the node grid. These values can be height (elevation), or any relevant parameter such as porosity, temperature, density or age. The values could also be pixel values for an image, such as a satellite image.

Therefore, each node 12 represents a local patch of information defined on a grid with fixed size. Each node 12 also comprises a time dependent geo-reference. This geo-reference locates the node grid in physical space and hence allows the node to be correctly located on the model. As the geo-reference is time dependent this can alter with time, which enables the physical location of the grid to change.

The nodes 12 are arranged in levels within the data tree 10 such that the deeper the level of the node, the higher the data resolution, i.e. the smaller the physical domain represented by the node 12. For example, the nodes 12 found within level 4 each represent a smaller physical domain than the nodes 12 contained in level 3.

The connections within the tree structure connect different levels of detail for the same physical region. Therefore, if a higher resolution than is found in a particular node is needed, the connections are followed down to the child nodes. This is referred to as splitting of a node. Alternatively, if coarser resolution is needed the connections are followed up to the ancestor node. This is known as merging nodes.

An example of this form of data tree is shown in FIG. 1B. Here the highest level tiles 20 are shown in bold. Each tile 20 has four child tiles 22. Each child tile 22 partially overlaps the area of its parent tile 20 but also extends past this. Therefore, each tile 22 has two parent tiles 20. Tiles 22 also have child tiles 24, shown in dotted lines. These have not been shown in relation to all of tiles 22 for clarity. Shaded tile 22a can be seen to have two parent tiles 20 and four child tiles 24. Each tile 20, 22, 24 comprises a regular grid having the same number of grid points, which can be used to store data. The tiles shown in FIG. 1B can be seen to form three layers covering the same physical space. Tiles 20 form a first layer, and provides a certain amount of information on the covered area. Tiles 22 form a second layer, and due to the smaller tile size this layer can contain more information than the first layer. Tiles 24 form the third and most detailed layer.

The tiles of FIG. 1B can therefore be seen to correspond to the nodes 12 of the data tree 10 of FIG. 1A. The smaller tiles represent deeper levels within the data tree.

This form of data tree can therefore be used to provide coarse or detailed resolutions of an image as required. In addition to the connections between different levels of detail, the hierarchical data tree 10 must enable traversal of the complete tree. This is typically provided by means of an iterator mechanism that successively delivers the next node 12 in the tree according to a known order of traversal. One example of such a system is the use of Sierpinski indices.

The hierarchically organized multi-resolutional data tree 10 shown in FIG. 1A can be used to store information on the physical properties of geographical locations on the surface and subsurface of the earth. When it is desired to view this data the modelling software of the present invention uses the data within the data trees to construct both the geometry and overlay of a model layer.

Figure 2A:
FIG. 2A shows a visualization of the earth's surface using data tree nodes.
Figure 2B:
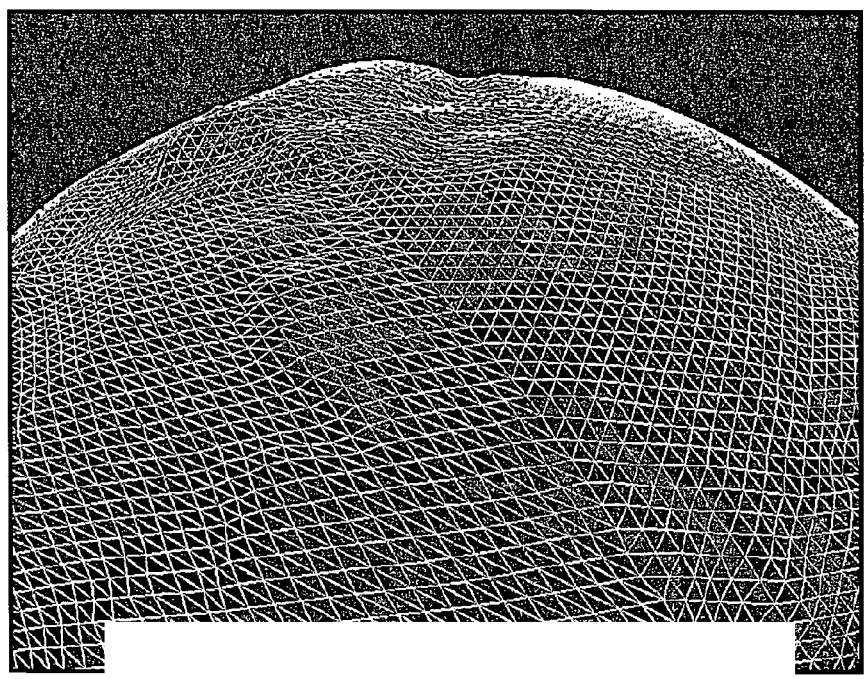
FIG. 2B shows the node grids of FIG. 2A and the underlying surface geometry of the layer.

FIGS. 2A and 2B show an example of a model layer created using data trees. FIG. 2A shows an image of the earth's surface on which the outlines of the nodes can be seen. The areas closer to the viewer are made up of deeper level, higher resolution nodes, whereas the areas further from the viewer require less detail and therefore are made up of coarser high level nodes. The layer is formed of a geometry, which shapes the surface of the layer, and an overlay, which provides the coloring and/or texture to be applied to the surface. In the present example, a single data tree containing a scalar field of elevation is used to create both the overlay and geometry. First, the geometry is created using the values within the data tree to create a spherical surface in which the z-values create a relief pattern. This can clearly be seen in FIG. 2B, which shows the grids of the nodes of FIG. 2A. Over this geometry an overlay can be added. In this example, the overlay uses the same z-values which have been used to create the geometry. However, in the overlay, differences in elevation can be represented by changes in color. When the overlay is added to the geometry the result is the layer shown in FIG. 2A. However, the node outlines shown in this Figure are not normally visualized.

As it is easier for the human eye to pick up changes in color rather than geometrical shape it is common for the data within a layer to be represented through the overlay as opposed to the geometry. Therefore, the geometry may not include z-values from the data tree, in which case the created geometry will have a smooth surface.

According to one embodiment of the invention a large database of data trees is provided, these data trees containing data relating to global, regional and highly localized areas and containing different types of data, for example elevation, temperature etc. These various data trees, referred to as "fields" within the below described embodiments, can be used to create the geometry and overlay for a wide range of layers. Although the user can use the data trees as desired to create geometry/overlay pairs (layers), the system can provide a number of predefined layers. These are layers which have been found to be, or are believed likely to become, commonly used.

Figure 3:
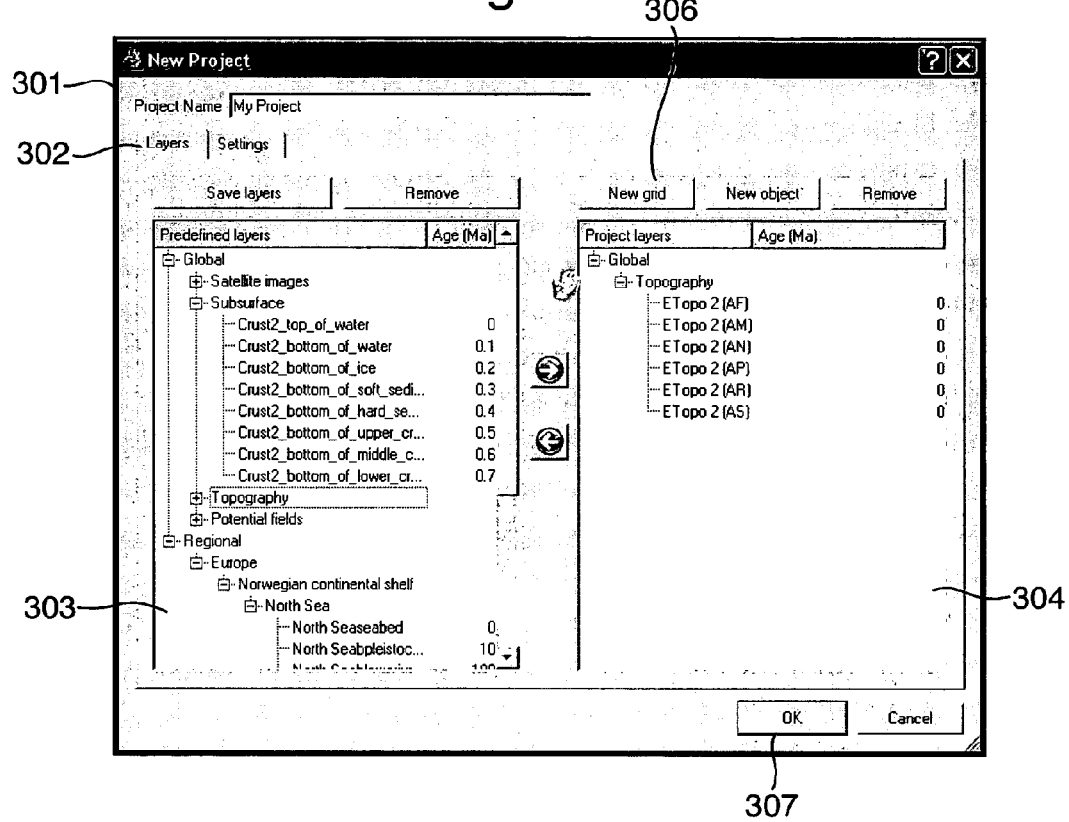
FIG. 3 shows a project window of a modelling system of the present invention which enables users to select the desired layers for visualization.

FIG. 3 shows an example of a menu within a modelling system of an embodiment of the present invention. When it is desired to create a model the user opens the window shown in this figure. After first naming the new model in the "project name" field 301 the desired layers of the model can be chosen.

The window tab 302 named "layers" contains two list views. The one to the left 303 contains predefined layers that are organized in hierarchical categories relative to location and data type. Therefore, those layers covering the entire surface of the globe are listed under the "global" category and within this category the layers are further split into those relating to satellite images of the earth surface, those relating to various subsurface regions etc. Layers covering only parts of the globe are found under the "regional" category. Showing a regional layer in isolation would result in a blank globe except for the region on which data had been collected.

The list on the right 304 represents the layers loaded into the new model, and is initially empty. Layers can be added to the new model by highlighting the desired layer from list 303 and clicking button 305 to copy this layer to the new model.

As well as selecting pre-defined layers, a user can also create their own geometry/overlay combinations. This is achieved by selecting the "new grid" button 306 which opens the window shown in FIG. 4A. Within this window the name of the new layer can be entered into field 401 and associated with a category by filling field 402. For example, if the new layer will contain data relating to the whole globe, this can be stored in the "global" category whereas if the data will relate only to a particular region, for example Europe, this should be stored within the "regional/Europe" category. Fields 403 and 404 allow the user to associate a plate identifier and an age with the new layer respectively. Plate identifier field 403 is relevant if the grid layer is to relate to a particular tectonic plate, otherwise this field should be set to zero. Setting an age to the layer can have benefits during time rotation, as will be discussed below.

As mentioned above, each layer of the model consists of a geometry and overlay. The geometry defines the actual surface, while the overlay refers to the data depicted on the surface. The overlay can for example be an image that will be used as a texture, or height field that can be used for contour plots. The data tree to be used for the overlay can be chosen by clicking on the open icon 405 of the overlay text field 406. This brings up a hierarchical representation of all available data trees ("fields"), as shown in FIG. 4B. As with the pre-defined layer list 303, the available data trees are shown in categories relative to location and data type. The user can choose the desired data tree for creating the overlay by simply selecting it within the window shown in FIG. 4B and clicking the "OK" button 408.

The geometry can then be chosen in the same way. The system can be adapted such that an initial selection of an overlay (or a geometry) will lead to a default choice of a matching geometry (or overlay). However, this default choice can always be overwritten by the user. As well as selecting individual data trees to form the geometry and overlay of a layer, the system of the present invention enables the user to create layers by combining data trees in a manner not previously possible.

This is achieved by allowing the overlay and/or geometry to consist of a formula through which data values within one data tree can replace those of another or alternatively the data values of differing trees can be mathematically combined.

Figure 4A:
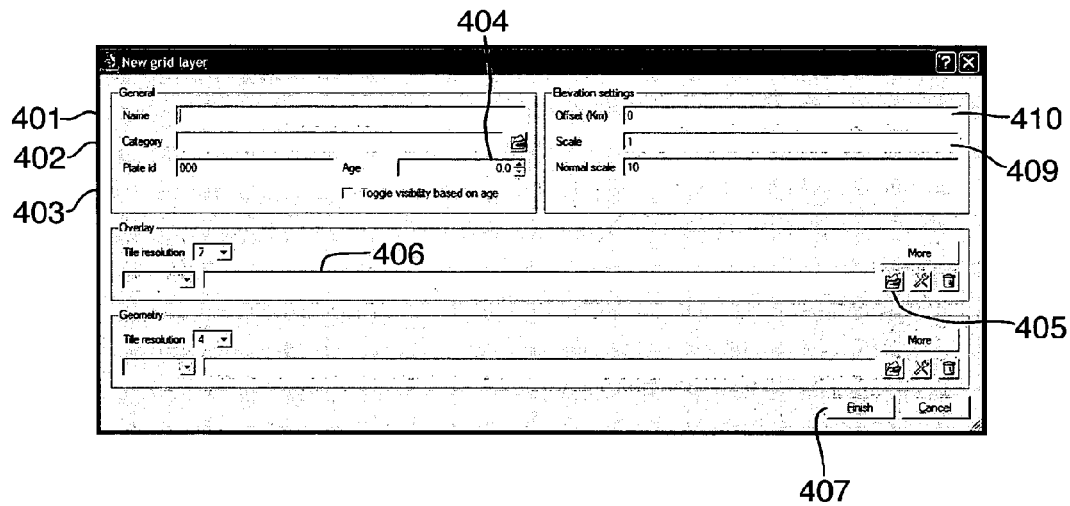
FIG. 4A and FIG. 4B show menu options within a modelling system for creating a new model layer.
Figure 4B:
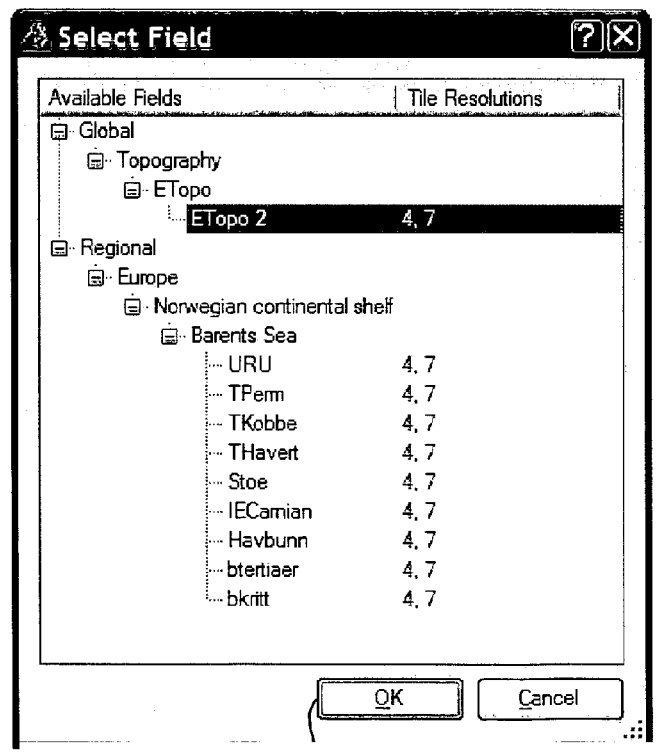

FIG. 5A again shows the new layer window first shown in FIG. 4A. However, in FIG. 5A the overlay includes two data trees. In the first overlay field 506a the main data tree is selected in a similar manner as discussed previously. However, the user can then enter a second data tree into the second overlay field 506b, by clicking on the open icon 505b. The operator used to combine the data trees is displayed in operator field 510. In the present case the operator "replace" is selected. In order to specify how the replacement is done the advanced setting icon 511 is clicked. This opens the window shown in FIG. 5B. Here it is possible to set minimum and maximum values for the data range which will be subject to replacement as well as the palette range.

In one example of a replacement formula, a data tree containing satellite imagery with relatively detailed topography but little information on sea depth can be combined with a data set containing bathymetric data. In this instance, in the advanced settings window shown in FIG. 5B, the height range for replacement would be set between the lowest point of the sea bottom (−10,600) and the sea surface (0). The data values falling within this range will then be extracted from the bathymetric data tree and used in place of the equivalent data from the satellite imagery data tree. In this way two separate data trees can be manipulated by the modelling method in order to provide a single layer with both topographical and bathymetric detail.

Figure 6:
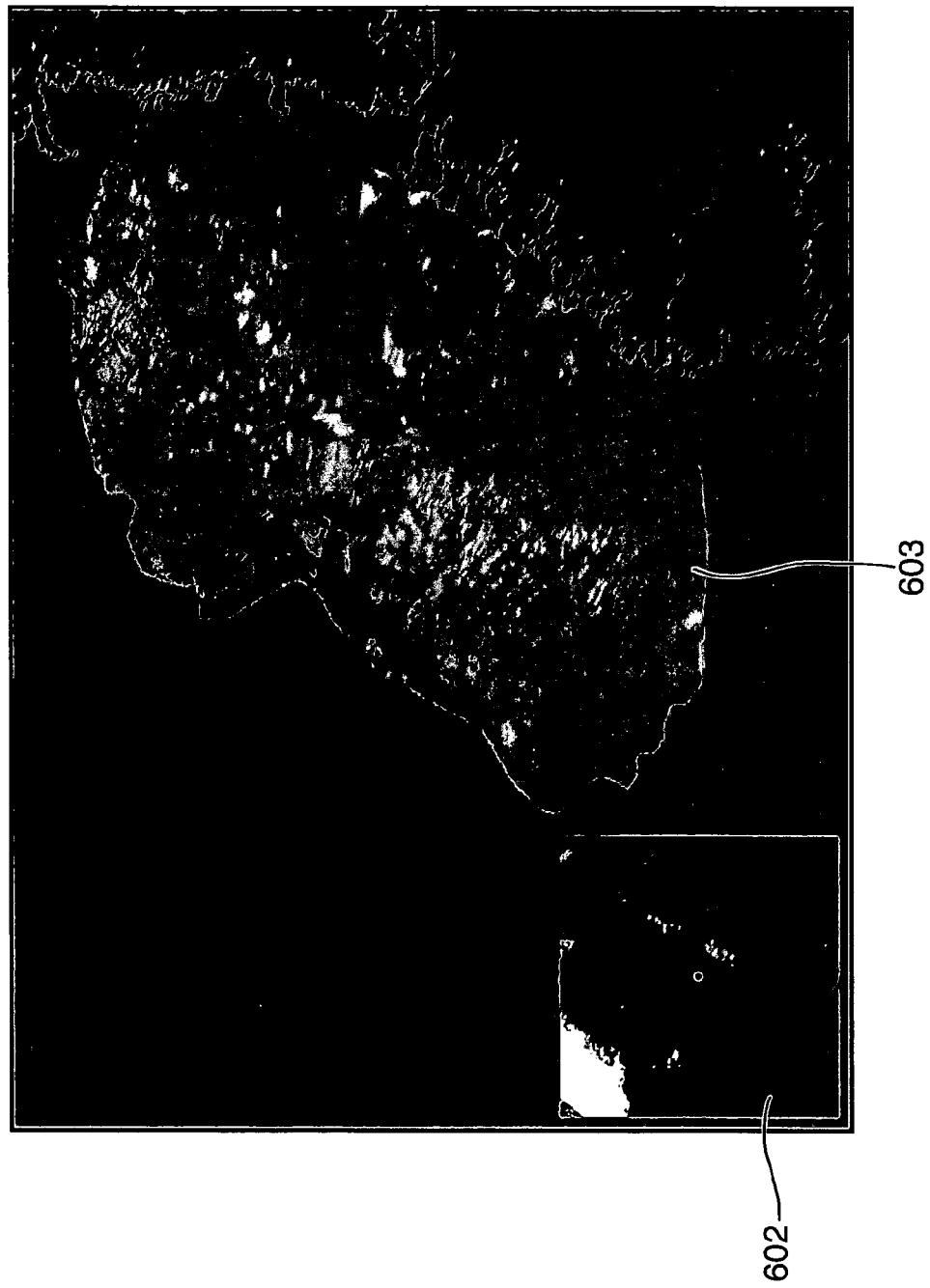
FIG. 6 shows a close up of layer in which a patch of high resolution data has been included in a coarser global data tree.

This type of replacement formula can also be used to insert higher resolution data into a lower resolution background set. An example of this is shown in FIG. 6. Navigation globe 602 (discussed later) indicates the current viewing location and in the main rendering window the higher resolution inset 603 can clearly be seen.

FIG. 7 again shows the new layer window in which the operator field 710 has been altered to select the "subtract" operator. Therefore, the overlay will subtract the data values of one data tree from the data values of a second data tree as selected in the first and second overlay fields 706a, 706b. This subtract function can be used to display the thickness between two subsurface layers. This thickness is usually displayed as overlay on a geometry formed by one of the subsurface layers used in the thickness computation. By clicking on the advanced settings icon 711 this subtraction function can be set such that it only occurs over a certain range of values.

As well as the "replace" and "subtract" operators it is also possible to select the "add" operator when desired.

Figure 8:
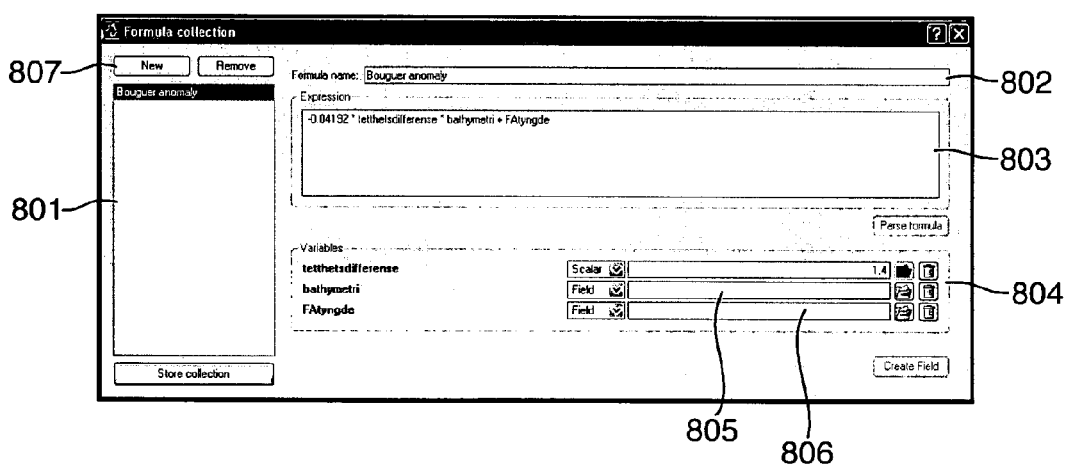
FIG. 8 shows a menu for selecting predefined formula.

In addition to these operators, the modelling system also enables the calculation of more advanced geometry and overlay formulas. The modelling system can contain predefined formulae contained in the formula collection window shown in FIG. 8. On the left hand side of this window is a list 801 of the formulas that had been predefined. By selecting a formula on the list 801 the area to the right hand side is filled with information about the selected formula. From top to bottom the name of the formula is supplied in a field 802, the formula itself is contained in the expression field 803 and finally a list of the variables occurring in the formula is found in box 804. The variables can be either scalar or field values. In the example shown in FIG. 8 the first variable is given a scalar value of 1.4 whereas the remaining variables are said to be data fields, i.e. data trees. These are left blank to be selected by the user. In this way the formula can be applied to numerous data trees simply by inserting these into variable fields 805, 806.

Figure 9A:
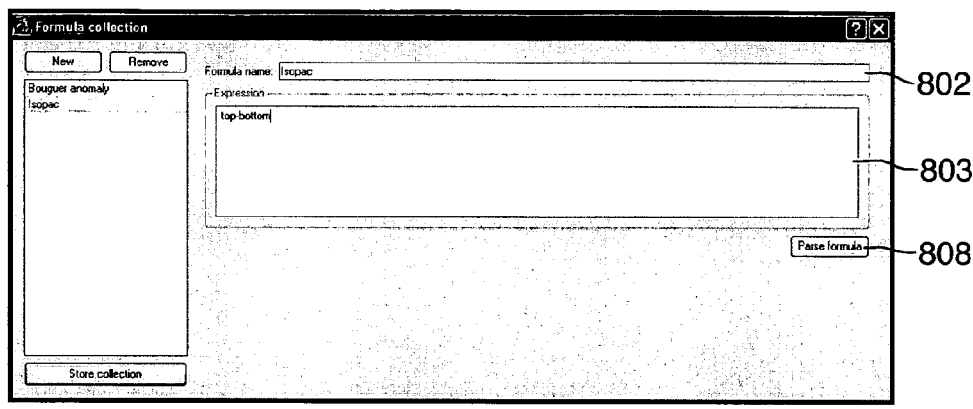
FIGS. 9A, 9B and 9C show a process for creating a new formula.
Figure 9B:
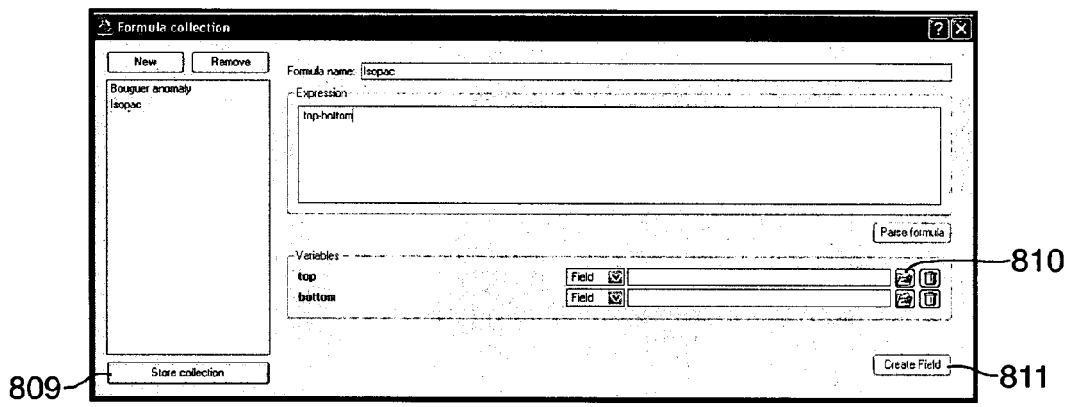
Figure 9C:
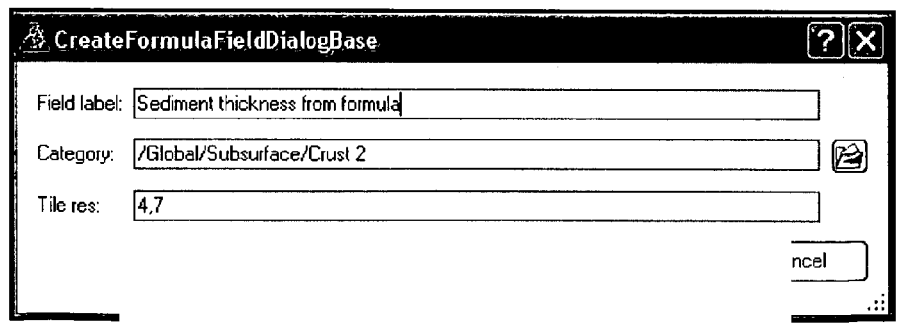

In addition to using predefined formula, the user can also create and store 5 new formula by clicking on the "new" button 807. When this button is clicked the name "Untitled-1" will appear in the name field 802 and the expression field 803 will be blank. The user can then alter the formula name as desired and create a new formula within the expression field 803. This is shown in FIG. 9A. After the expression has been created the user can click the "parse formula" button 808. The 10 formula will then be validated and if the expression is correct the variable list will appear below the expression field. This is shown in FIG. 9B. The "store collection" button 809 can then be clicked to save the newly defined formula within the formula collection for later use. In order to select a data tree for use in this formula the user simply clicks on the open icon 810 associated with each variable. Once a data tree 15 has been selected for each variable the "create field" button 811 is enabled. By clicking this button 811 the window shown in FIG. 9C is opened and this combination of data trees is saved for use in creating new layers.

The use of formula within the geometry and overlay allows the modelling method to manipulate data without the need to build new data trees in which this 20 manipulation is contained. This increases the adaptability of the system and reduces memory space.

Once the data tree(s) for the geometry and overlay have been selected, layer creation can be completed by clicking the "FINISH" button 407, 507, 707. This returns the user to the window of FIG. 3, which is updated to show the newly created 25 layer in both lists 303, 304.

Figure 10:
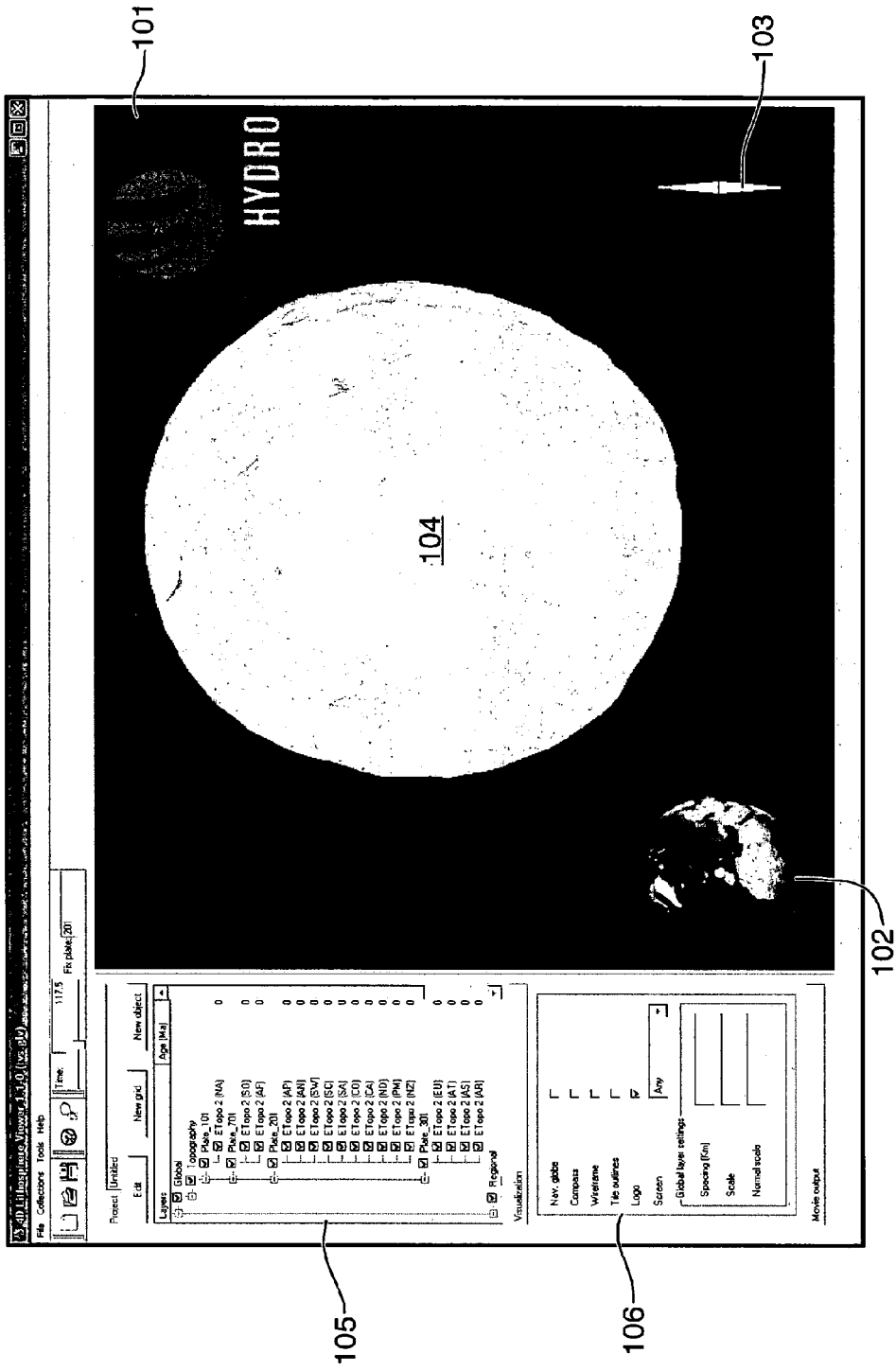
FIG. 10 shows an example of a rendered model of the earth using the system of the present invention.

Once the desired layers have been selected (or created) and placed within list 304 the user can exit the window by clicking on the "OK" button 307. This returns the user to the main window within which the newly created model can be opened. An example of a rendered model is shown in FIG. 10. The model 104 is shown in a 30 rendering window 101 together with a navigation globe 102 and compass 103. The navigation globe 102 turns and zooms corresponding to the navigation of the rendered model 104. However, regardless of the layer visualization of the model itself, the navigation globe 102 always shows the earth surface. The central dot in the middle of the navigation globe 102 refers to the centre of the rendering window 101. The navigation globe 102 therefore provides efficient visual feedback of the location when navigating at subsurface positions. Compass 103 gives the north/south directions as viewed from the central dot of the navigation globe 102. These two devices assist the user when viewing the rendered model 104. To the left of the rendering window 101 is the control panel of the user interface. The upper part contains the list of layers 105 present in the model. As with the lists of FIG. 3 the layers are listed in a hierarchical fashion. By selecting and deselecting these layers the user can adjust the rendered scene.

In the lower part of the panel a menu 106 controlling visual parameters is found. By adjusting the checkboxes the navigation globe 102, compass 103, tile (node) outlines (as shown in FIG. 2A), wireframe (the underlying grid, as shown in FIG. 2B) and logo can be toggled on and off. Right below these checkboxes there is a pull down menu where the user can select the screen size to be used for screen rendering. There then appear fields for making multi-layer alterations to the spacing and scale of the layers. However, these features can also be set on a level by level basis.

As shown in FIG. 4A, when creating a new layer the scaling can be set within scale field 409. Increasing the scale value exaggerates the surface elevation compared to the height value in the underlying data tree. Changes in the scale of a layer can be made after its initial creation through an edit layer function. Also found within the new layer window (FIG. 4A) or edit layer window is an offset field 410. This is the offset value (in km) from the Earth's surface, which will be added to the height field it is applied to. This feature makes it possible to visually separate different surfaces that otherwise would coincide or intersect.

Returning to 10, menu 106 allows these settings to be changed for multiple layers within the same model. The last three parameters in menu 106 refer to global spacing and two types of scaling values. By setting the first two of these parameters the user will change the offset values and surface scaling values of the layers currently being visualized (i.e. those checked in list 105). The third parameter works in a slightly more complicated way. Instead of using normal vectors for the depicted surface for the shadow rendering, the normals corresponding to a scaled version of the surface will be used. The depicted surface itself is not scaled. This procedure exaggerates certain surface details. All of these global settings will override the values set locally for the affected layer(s). While the global scaling value will be copied to the layers, the spacing value defines the step between offset values belonging to different layers. Alternatively, in some systems the spacing may only be applied to layers having different ages. The spacing operation requires that at least two layers have been selected.

Figure 5A:
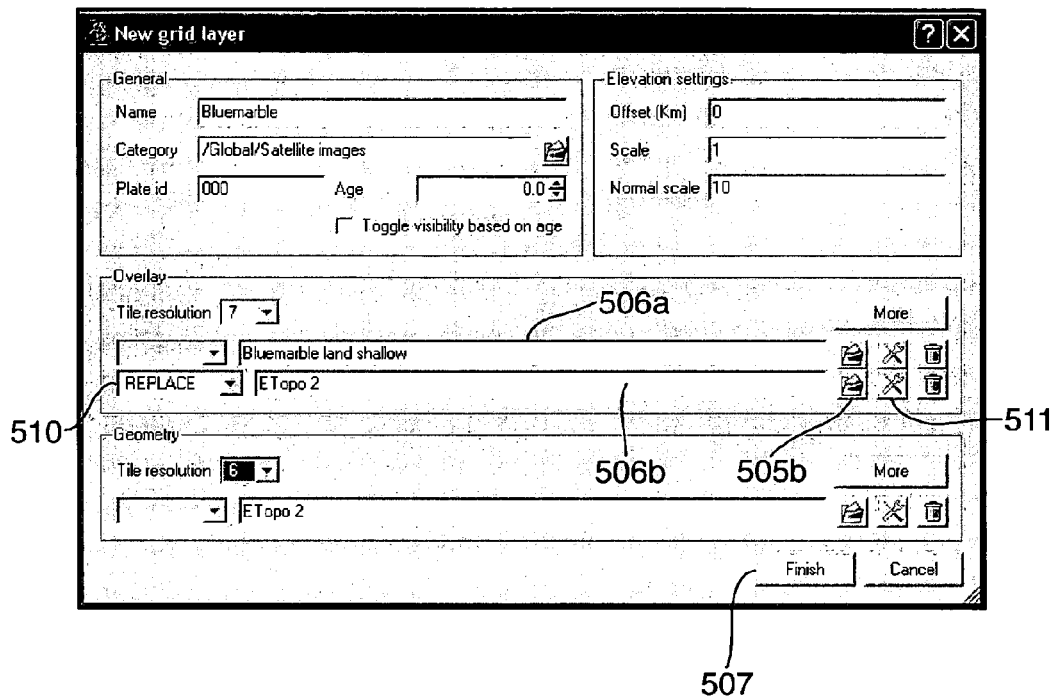
FIGS. 5A and 5B show menu options for using a formula for the overlay of a layer.
Figure 5B:
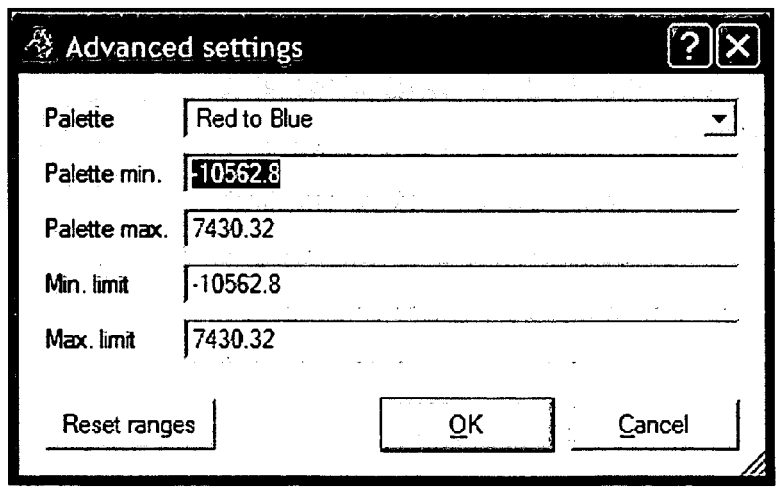
Figure 7:
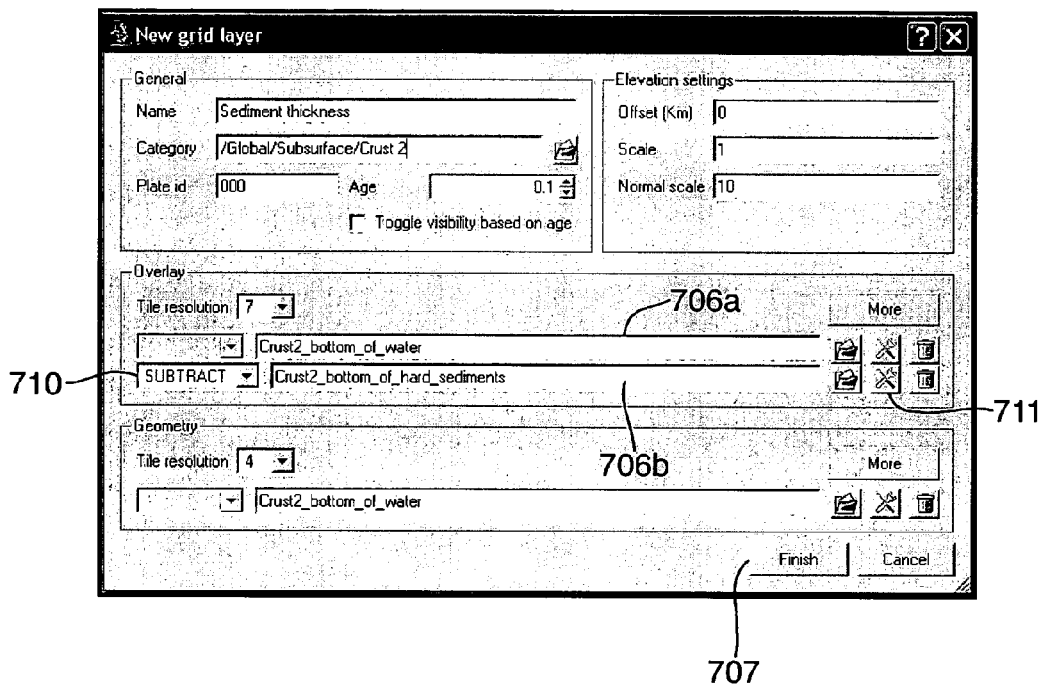
FIG. 7 shows a further example of using a formula within the overlay.
Figure 11:
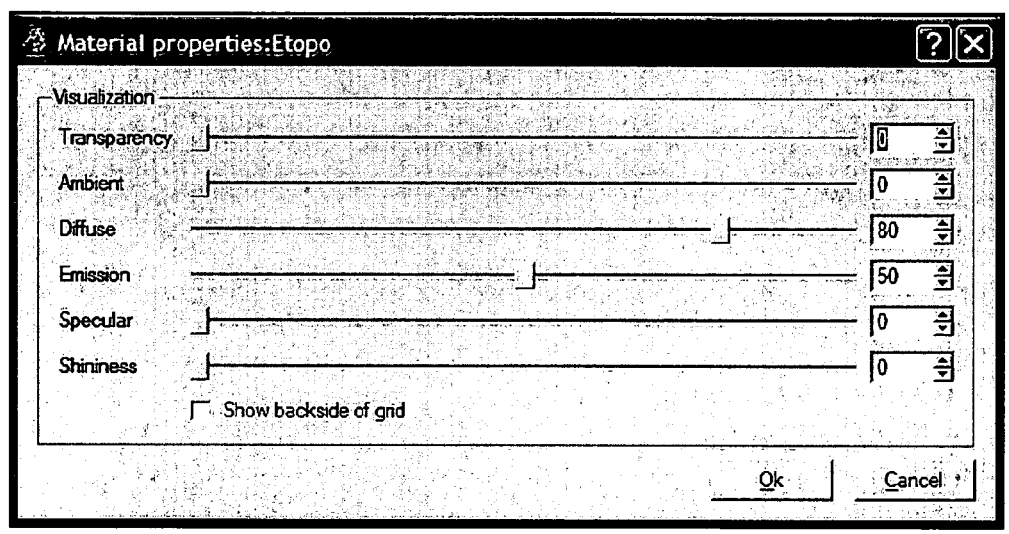
FIG. 11 shows a menu for adjusting rendering conditions for the selected layers.

By right clicking on a layer in list 105 its material settings can be changed. The material settings control how a layer is rendered. By opening the material property window, shown in FIG. 11, these material settings can be adjusted. The visual appearance of any layer depends greatly on the material settings used to render it. For example the structure (geometry) of a layer is much more visible when emission is reduced, however the colors generally become darker. As shown in FIGS. 4A, 5A and 7, an age can be associated with each layer of the model. As well as enabling spacing based on layer age, this is beneficial when the model is rotated through time.

Time rotation can be achieved by use of a rotation model which lists the rotation angle of each tectonic plate for a past time. By creating a plurality of data trees each relating to a single tectonic plate, these data trees can be rotated back through time using a rotation model. This is due to the provision of time dependent geo-references for each node. The ability to rotate grid based data in time has numerous advantages. For example, according to the modelling method of the present invention the overlay can be set such that data points are masked if the model is rotated past the age associated with that data point. Therefore tectonic plates brought closer together due to time rotation can still be rendered clearly, without any visual overlap. In addition layers requiring formula to be applied to the data trees can still be rendered after rotation. Furthermore, the age of the rendered model and the age of the data points can play a part in the formula. Thus, the displayed data can alter depending on the time that the model has been rotated to. By setting an age to an entire layer, this whole layer can be removed if it is not relevant to the rendered age, thus speeding up rendering time.

Figure 12:
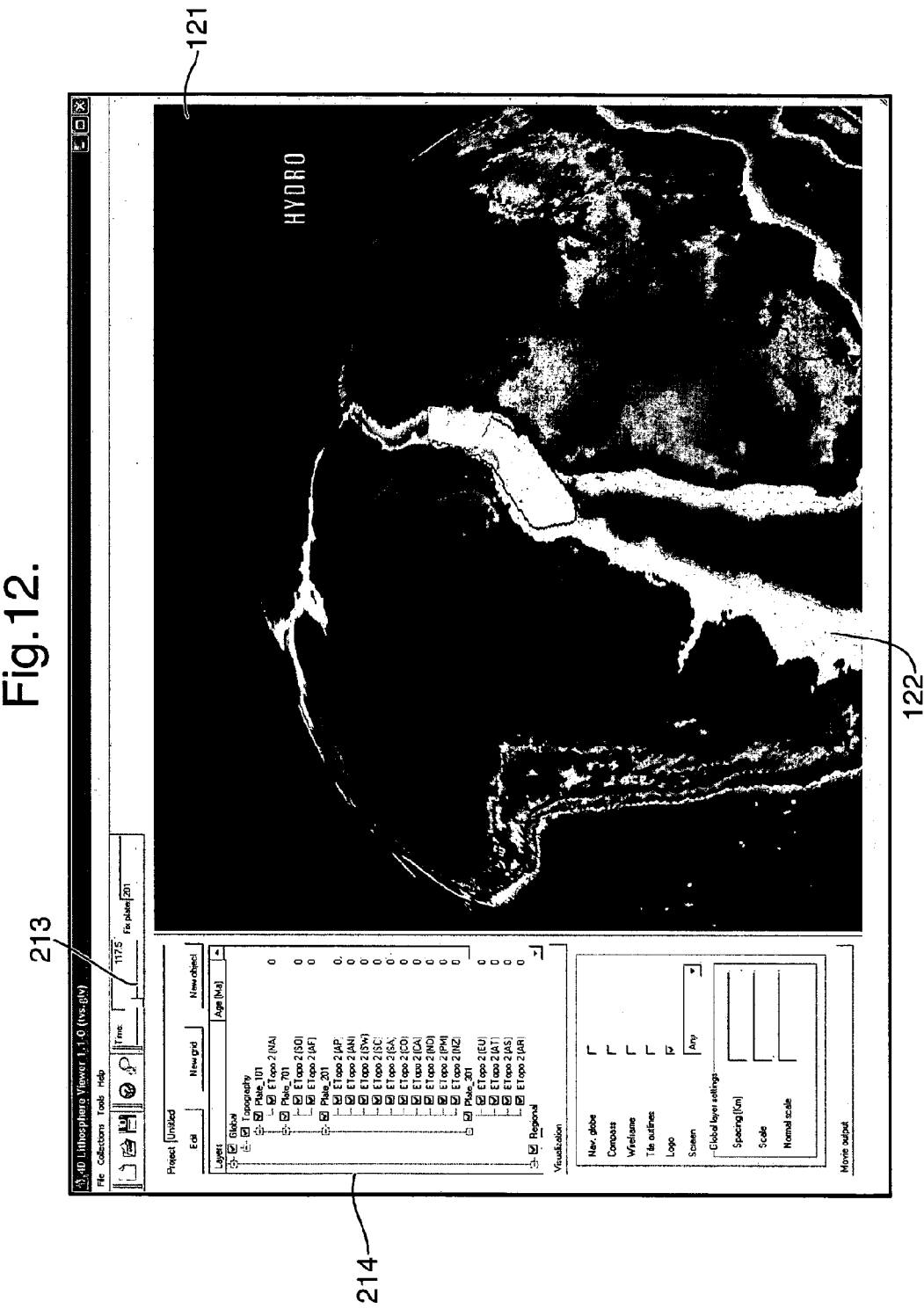
FIG. 12 shows a visualization of the model rotated through time.

FIG. 12 shows an example of a time rotated model. In this example the rendering window 121 shows a time rotated model 122 in which six major tectonic plates have been rotated to their position 180 million years ago. The current represented time is indicated by slider 213. The layers of the rendered model 122 are indicated in window 214 and these can be removed and added to the model as desired. The overlay in this model has been chosen to mask areas of the plate having an "age of appearance" after the rendering time. In this way, no visual overlap occurs.

By rotating the model in this way, areas which are known to contain natural resources can be studied in their past positions and, from this, potential areas of new deposits can be located. For example, if an oil rich location at one time bordered another tectonic plate, the location of this neighbouring area can be tracked to the present day. Alternatively the paleowaterdepth and heatflow or other values can be calculated using time rotated data trees, in order to estimate the past conditions which have caused known deposits of oil and gas. Locations having similar conditions can then be sought and their present day location explored.

Figure 13A:
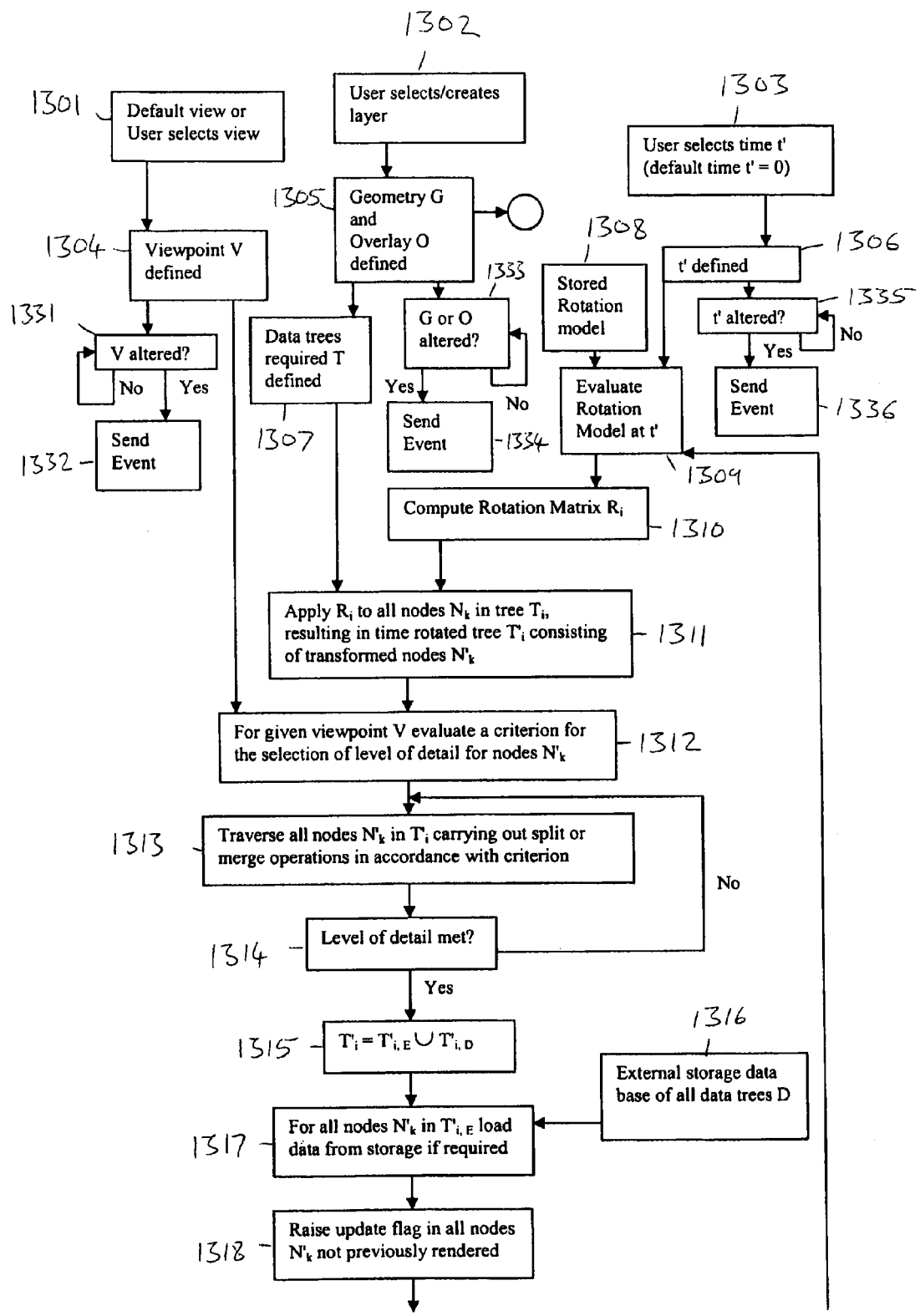
FIGS. 13A and B show a flow chart representing the method steps of the rendering algorithm.

According to the modelling method of the present invention, a single high level algorithm is used to control time rotation, age masking and formula based geometry/overlay. This algorithm will be described below. FIGS. 13A and B shows a flow chart representative of the inputs into and actions of the algorithm used in a preferred embodiment of the invention.

The actions taken by the user are shown in steps 1301, 1302, 1303. Step 1301 shows either the use of a default view or selection of a view by the user. Step 1302 is the user selecting or creating a layer. Step 1303 is the user selecting a time t', or the process beginning with a default time t'=0. Subsequent steps follow each initial action 1301, 1302, 1303 as discussed below, with the processes converging at steps 1311 and 1312.

In relation to the selection of layers (step 1302), as discussed previously, when creating a model the user selects a number of layers to be shown in the earth model. These can be predefined layers stored in the system or the user can create a new layer as outlined in, for example, FIGS. 4A and 4B. As a layer consists of a geometry and overlay, upon the user selecting or creating a layer (step 1302) the geometry G and overlay O will be defined (step 1305). These will either already be stored in the system, in the case of pre-defined layers, or alternatively if the user is creating a new layer the geometry and overlay will be selected during the layer creation. Each geometry and overlay are linked to one or more data trees and therefore the definition of geometry and overlay will automatically define a number of data trees T required in order to render the selected layer (step 1307).

The system can be programmed to initially render the model from a default view, or alternatively the user may select a start point (step 1301). After selection of this view the user may select different views through navigation of the rendered model via their mouse or keyboard and zoom into or out of the model. Whenever the user adjusts the view, a new viewpoint is defined (step 1304).

Unless the user chooses to rotate the model through time at step 1303, a default time of the present day will be set (t'=0) at step 1303. In order to change the time at which the model is being viewed the user can adjust the time via a slider within the menu (see FIG. 12) or through typing in the desired age. The time at which the model is to be viewed is therefore defined either by user selection or through the system default (step 1306). This user defined and default information is then inputted into the algorithm during the rendering process.

A rotation model is stored within the system. This can be updated or replaced with a new model independently to the modelling method. The rotation model contains information regarding how the tectonic plates have changed position. Using the defined time t' the rotation model is evaluated at step 1309. Based on this evaluation, the algorithm computes a rotation matrix $R_i$ valid for time t' (step 1310). The computed rotation matrix $R_i$ is then applied to the time dependent geo-references of all nodes $N_k$ in trees $T_i$ in order to rotate these nodes to the desired time point (step 1311). The rotation creates time rotated trees $T'_i$ consisting of transformed nodes $N'_k$ (step 1311). The number of data trees T is defined at step 1307 as discussed above.

Using the viewpoint V defined at step 1304 the algorithm then evaluates a criterion for the selection of level of detail for the nodes $N'_k$ (step 1312). All nodes $N'_k$ within trees Ti are traversed by the algorithm and split or merge operations are carried out in accordance with the level of detail criterion (step 1313). In this step 1313, the split or merge moves only one level down or up the hierarchical tree structure. Therefore, if there is a need for split or merge operations covering a distance of more than one level, a repetition of this step is required. At step 1314, after traversal of all the nodes at step 1313, the required level of detail is checked. If the required level of detail has not been met the algorithm repeats step 1313. Once the correct level of detail has been achieved the algorithm has created a group representation of $T'_i$. At this stage (step 1315) $T'_i = T'_{i,E} \cup T'_{i,D}$, where $T'_{i,E}$ is the set of nodes that after the rotation are enabled for visualization. The remainder is $T'_{i,D}$ which consists of nodes that will not be used in the visualization. Once the algorithm has defined the enabled set of nodes $T'_{i,E}$ any data required for these nodes is loaded from storage in step 1317. This step is necessary when a large number of data trees are stored centrally, independently of the computer or computer network on which the rendering algorithm is run. in such circumstances, only the data trees of interest $T_i$ are uploaded into the memory of the operating system. Therefore, whenever new data trees are required, these must be retrieved from the external storage 1316. If any of the nodes within $T'_{i,E}$ have not been previously rendered, an update flag is raised in step 1318.

Figure 13B:
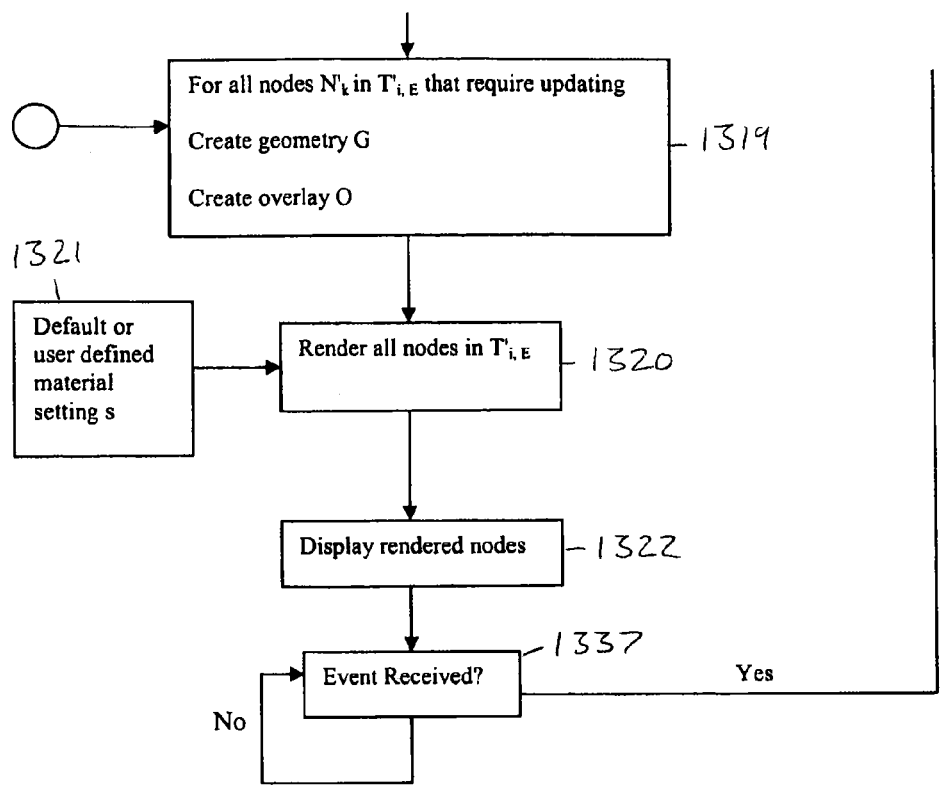

The next steps are shown in FIG. 13B. For all nodes which require updating the geometry G and overlay O defined at step 1305 are applied to the flagged nodes in step 1319. This generates the surface of the layer and the texture and coloring which will be applied to it for the particular nodes. All the nodes within $T'_{i,E}$ are then rendered by the algorithm in step 1320. During the rendering step 1320 default or user defined material settings 1321 will be applied to the generated layers. This includes any scaling and offset as well as various other visual effects. Finally, the rendered scene is displayed to the user in step 1322.

In the situations in which the user wishes to view a present day model of the earth the default time t'=0 will be selected. The rotation matrix computed at step 1310 will therefore equal an identity matrix I and no transformation will occur to nodes $N_k$. Therefore, in this situation $N'_k = N_k$ and the remaining stages of the algorithm will be carried out on the non-rotated nodes.

Step 1319 allows the geometry G and overlay O to comprise a formula. Therefore, at this stage in the algorithm data within the nodes can be manipulated through replacement or combination with data from other data sets. A greater degree of flexibility can therefore be provided by the system.

At this stage the overlay O can also determine which grid points within the nodes should contribute to the rendering and which should not. In this way, the algorithm can implement an age dependent masking of the model surface.

Regarding step 1311, the application of the rotation matrix $R_i$ to the nodes $N_k$, this can be achieved in one of two ways. In the case of on-screen rendering, the actual point wise multiplication with the rotation matrix $R_i$ is not carried out. Instead, $R_i$ is served to the rendering engine, which will carry out the transformation as part of the rendering process. However, in cases of data export showing rotated data sets, the multiplication with $R_i$ must be done explicitly, resulting in new coordinate values for the grid points that can be saved to a file.

In some embodiments, step 1319 will often use a scene graph, for example OpenSceneGraph™. This simplifies the layout of the scene to be rendered and communication with the rendering engine. In such cases, the nodes within $T_{i,E}$ will be associated with the nodes in the scene graph, and the traversals in step 1319 will be formulated in the context of the scene graph.

The algorithm of FIGS. 13A and 13B can be embedded in an event handling mechanism that will cause it to be run on demand. In other words, the algorithm is not repeated continuously but instead is only run when one of a number of specific events occurs. When the user makes a change to the model, for example by altering the viewpoint, or changing the geological age, this triggers a new running of the method so that the rendered scene reflects the changes made by the user. This is illustrated within FIGS. 13A and 13B. Here, the method checks for changes in view V at step 1331, time t' at step 1335 or geometry G and overlay O at step 1333 (for example the addition or alteration of a layer) and sends or posts an event if any such changes are registered (steps 1332, 1336, 1334 respectively). When an event is received at step 1337 the method returns to step 1309 and the image is re-rendered to take the changes into account. Changes in the material settings may also result in an event being posted. The event loop could also be implemented in different ways to that illustrated herein.

The algorithm outlined above is formulated as one sequence of tasks. However, in order to achieve a maximum level of interactivity and continuous flow of rendered frames, advanced applications can use an asynchronous version of this algorithm. In these more sophisticated approaches, a second, concurrent thread can be executed asynchronously with the main thread. This secondary thread can have different duties, for example the data loading step 1317 will usually be out sourced to the secondary thread. Other duties will be dependent upon the hardware configuration. For example, if the CPU is used for data manipulation, step 1319 will be moved to the secondary thread. In this way, computationally intensive operations are not allowed to interrupt the rendering. Alternatively, if it is desired to maximize the use of the graphical processor, step 1319 will be kept in the main thread.

As will be appreciated, when certain steps are outsourced to a secondary thread the rendering in step 1320 may suffer from missing information. For instance, the secondary thread may not have managed to load the relevant field values when the node is meant to be rendered. In this case, the rendering will use a coarser resolution for that part of the scene until the relevant field values have been uploaded.

If the application runs in the CPU mode, the same type of conflict can arise if the geometry or overlay items associated with a particular node are missing at the time of rendering. Once again, in such circumstances the rendering can rely on coarser representations that are already available.

If unwanted data coarsening happens due to missing information, the correct rendering will take place in a later sweep of the algorithm once the relevant information has been provided by the secondary thread.

In some situations, such as when generating a movie file showing an animation of the visualized data sets, one will need to ensure that all frames are consistently rendered with maximum resolution. Since this type of operation is batch orientated and does not require interactive behavior, a single threaded implementation can be employed. Many desired systems can implement both the single and multithreaded variants of the rendering algorithm and switch between these depending on operational requirements.

An embodiment of the present invention includes the steps of obtaining a set of data relating to known geographical locations; arranging said data into at least one hierarchically organized multi-resolutional data tree, said tree comprising a plurality of nodes, each node having a grid with a fixed number of points to which data is associated and a geo-reference that locates the grid in physical space, wherein the geo-reference of each node is time dependent.

An embodiment can further comprise the further step of storing said at least one data tree.

An embodiment can further comprise the steps of receiving a request for access to one or more data tree; and transmitting the requested data trees.

An embodiment of the present invention includes the steps of obtaining at least one hierarchically organized multi-resolutional data tree, said tree comprising a plurality of nodes, each node having a grid with a fixed number of points to which data is associated and a time dependent geo reference that locates the grid in physical space, applying the rotation matrix to each time dependent geo reference within the at least one data tree.

An embodiment can further comprise the step of storing the resulting at least one time rotated data tree.

An embodiment can further comprise the steps of rendering and displaying the time rotated data tree.

An embodiment of the present invention includes a computer system having computer executable instructions adapted to configure a data processing apparatus to carry out the above described methods of the present invention.

An embodiment of the present invention including a data processing apparatus configured to generate a model of a physical entity using one or more hierarchically organized multi-resolutional data trees T, each data tree comprising a plurality of nodes $N_k$, each node having a grid with a fixed number of points to which data is associated, the apparatus comprising a processor configured to create a geometry using one or more data trees; and create an associated overlay using one or more data trees, wherein at least one of the geometry and overlay comprises a formula to be applied to data within one or more data trees.

An embodiment of the present invention includes a data processing apparatus configured to render a model of the earth for view V, at time t', using one or more hierarchically organized multi-resolutional data trees T, each data tree comprising a plurality of nodes $N_k$, each node having a grid with a fixed number of points with which data is associated and a time dependent geo-reference, comprising a processor configured to compute the required rotation matrix based on a pre-defined rotation model evaluated at time t'; apply the computed rotation matrix to the time dependent geo-references of all nodes $N_k$ in the one or more data trees T, resulting in one or more time rotated trees T', comprising transformed nodes $N'_k$; for the given view V evaluate a criterion for the selection of the level of detail for the nodes $N'_k$; traverse all nodes in T', conducting split or merge operations where necessary until the selected level of detail is achieved, thus creating a set of nodes $T'_{i,E}$ enabled for visualization; for all nodes $N'_k$ in $T'_{i,E}$, load data if necessary; raise an update flag in all altered nodes $N'_k$; for all nodes $N'_k$ in $T'_{i,E}$ which require updating, create geometry G; create overlay O; and render all nodes in $T'_{i,E}$.

An embodiment of the present invention includes a receiver for receiving a set of data relating to known geographical locations; a processor for arranging said data into at least one hierarchically organized multi-resolutional data tree, said tree comprising a plurality of nodes, each node having a grid with a fixed number of points to which data is associated and a geo-reference that locates the grid in physical space, wherein the geo-reference of each node is time dependent.

An embodiment can further comprise a memory for storing said at least one data tree.

An embodiment can further comprise a receiver arranged to receive a request for access to one or more stored data trees and a transmitter arranged to transmit the requested data trees.

An embodiment can further comprise an apparatus connected to a storage device in which a plurality of hierarchically organized, multi-resolutional data trees are stored.

An embodiment can further comprise a receiver for receiving a set of data relating to known geographical locations; a processor for arranging said data into at least one hierarchically organized multi-resolutional data tree, said tree comprising a plurality of nodes, each node having a grid with a fixed number of points to which data is associated and a geo-reference that locates the grid in physical space, wherein the geo-reference of each node is time dependent; and a memory for storing said at least one data tree An embodiment can further comprise a receiver for receiving a set of data relating to known geographical locations; a processor for arranging said data into at least one hierarchically organized multi-resolutional data tree, said tree comprising a plurality of nodes, each node having a grid with a fixed number of points to which data is associated and a geo-reference that locates the grid in physical space, wherein the geo-reference of each node is time dependent; and a memory for storing said at least one data tree.

An embodiment of the present invention includes creating a plurality of hierarchically organized multi-resolutional data trees, said trees each comprising a plurality of nodes, each node having a grid with a fixed number of points with which data is associated, wherein at least one tree contains data relating to subsurface locations; storing said plurality of data trees; and rendering a multilayered model of the Earth wherein the geometry and overlay of each layer contain data from at least one of said plurality of data trees, and wherein at least one layer contains information relating to a subsurface location.

An embodiment can further comprise a builder means for creating the plurality of data trees, a memory means for storing the data trees, and a processor means for rendering the model using said data trees.

An embodiment of the present invention includes creating a plurality of hierarchically organized multi-resolutional data trees, said trees each comprising a plurality of nodes, each node having a grid with a fixed number of points to which data is associated, wherein at least one tree contains data relating to subsurface locations; and storing said plurality of data trees or transmitting said plurality of data trees.

An embodiment of the present invention includes obtaining a plurality of hierarchically organized multi-resolutional data trees; and, using the data trees, rendering a multilayered model of the Earth wherein the geometry and overlay of each layer contain data from at least one of said plurality of data trees, and wherein at least one layer contains information relating to a subsurface location.

An embodiment can further comprise displaying the rendered model, storing the model and/or transmitting the model to a remote location.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

The invention claimed is:

1. A method for generating a hierarchical, multi-resolutional, adaptable model of a physical entity to enable subsequent manipulation of data during rendering, using one or more hierarchically organized multi-resolutional data trees T, each data tree comprising a plurality of nodes $N_k$, each node having a grid with a fixed number of points to which data is associated, the method comprising the steps of:

creating a geometry using one or more data trees;

creating an associated overlay using one or more data trees, and enabling subsequent manipulation of data within the data trees during rendering, wherein at least one of the geometry and overlay comprises a formula to be applied to data within one or more data trees;

wherein the geometry comprises the formula $F_G(\tilde{T}_1, \ldots, \tilde{T}_m; \alpha_1, \ldots, \alpha_r)$ where, $\tilde{T}=\{\tilde{T}_j\}_j \subset T$, and $\{\alpha_j\}_j$ are real-valued parameters representing properties associated with the geometry, and/or that the overlay comprises the formula $F_O(\hat{T}_1, \ldots, \hat{T}_n; \beta_1, \ldots, \beta_s)$ where, $\hat{T}=\{\hat{T}_j\}_j \subset T$, and $\{\beta_j\}_j$ are real-valued parameters representing properties associated with the overlay, where the variables k, m, r, j, n and s are integers, and wherein $\tilde{T}$ and $\hat{T}$ are data trees T associated with the geometry and overlay, respectively.

2. The method of claim 1 further comprising the steps of rendering and displaying the model.

3. The method of claim 1 wherein the formula comprises a replacement formula in which data values from one data tree are replaced with values from another data tree if stipulated conditions are met.

4. The method of claim 1 wherein the formula comprises an arithmetical formula.

5. A method for generating a model of a physical entity using one or more hierarchically organized multi-resolutional data trees T, each data tree comprising a plurality of nodes $N_k$, each node having a grid with a fixed number of points to which data is associated, the method comprising the steps of:

creating a geometry using one or more data trees; and creating an associated overlay using one or more data trees, wherein at least one of the geometry and overlay comprises a formula to be applied to data within one or more data trees;

wherein the nodes $N_k$ of the one or more data trees T each comprise a time dependent geo-reference, the method further comprising an initial step of:

applying a pre-defined rotation matrix to each time dependent geo reference within the at least one data tree to create a time rotated data tree T' comprising a plurality of nodes $N'_k$;

and the remaining steps are conducted on the nodes $N'_k$ of the one or more time rotated data trees T'.

6. The method of claim 5 wherein the formula to be applied to the data is a function of time rotation.

7. The method of claim 5 wherein the data stored within at least one data tree includes at least one value representing the age of the data points.

8. The method of claim 7 wherein the formula to be applied to the data adjusts the data according to the age of the data.

9. The method of claim 7 wherein the pre-defined overlay is arranged to mask those data points having an age either greater or less than that of the time being rendered.

10. The method of claim 5, wherein the model is a model of the earth and the one or more data trees T represent tectonic plates.

11. A method for generating a model of a physical entity using one or more hierarchically organized multi-resolutional data trees T, each data tree comprising a plurality of nodes $N_k$, each node having a grid with a fixed number of points to which data is associated, the method comprising the steps of:

creating a geometry using one or more data trees; and creating an associated overlay using one or more data trees, wherein at least one of the geometry and overlay comprises a formula to be applied to data within one or more data trees;

wherein the nodes $N_k$ of the one or more data trees T each comprise:

a time dependent geo-reference;

the method further comprising the initial steps of;

a01) receiving desired time t' for which model is to be rendered;

a02) computing the required rotation matrix based on a pre-defined rotation model evaluated at time t';

a03) applying the computed rotation matrix to all nodes $N_k$ in the one or more data trees T, to create one or more time rotated data trees T' comprising a plurality of nodes $N'_k$;

wherein the remaining steps are conducted on the nodes $N'_k$ of the one or more time rotated data trees T'.

12. A method for rendering a model of the earth for view V, at time t', using one or more hierarchically organized multi-resolutional data trees T, each data tree comprising a plurality of nodes $N_k$, each node having a grid with a fixed number of points to which data is associated and a time dependent geo-reference, the method comprising the steps of:

a) computing the required rotation matrix based on a pre-defined rotation model evaluated at time t';

b) applying the computed rotation matrix to the time dependent geo-references of all nodes $N_k$ in the one or more data trees T, resulting in one or more time rotated trees T', comprising transformed nodes $N'_k$;

c) for the given view V evaluating a criterion for the selection of the level of detail for the nodes $N'_k$;

d) traversing all nodes $N'_k$ in T' conducting split or merge operations where necessary until the selected level of detail is achieved, thus creating a set of nodes $T'_{i,E}$ enabled for visualization, where i is an integer referencing the one or more time rotated trees T' that are enabled;

for all nodes $N'_k$ in $T'_{i,E}$ e) loading data if necessary;

f) raising an update flag in all altered nodes $N'_k$; for all nodes $N'_k$ in $T'_{i,E}$ which require updating g) creating geometry G;

g) creating overlay O; and h) rendering all nodes in $T_{i,E}$.

13. A data processing apparatus configured to render a model of a physical entity for a view V, using one or more hierarchically organized multi-resolutional data trees T, each data tree comprising a plurality of nodes $N_k$, each node having a grid with a fixed number of points to which data is associated, the apparatus comprising a processor configured to evaluate a criterion for the selection of the level of detail for the nodes $N_k$, traverse all nodes $N_k$ in T until there is no need for split or merge operations thus creating a set of nodes $T_E$ enabled for visualization; for all nodes $N_k$ in $T_E$, obtain data if necessary and raise an update flag in all altered nodes $N_k$, for all nodes $N_k$ in $T_E$ which require updating create geometry G; create overlay, O; and render all nodes in $T_E$, wherein at least one of the geometry and overlay comprises a formula to be applied to data within one or more of data trees T; and wherein the geometry comprises the formula $F_G(\tilde{T}_1=\tilde{T}_m; \alpha_1,\ldots,\alpha_r)$ where, $\tilde{T}=\{\tilde{T}_j\}_j \subset T$, and $\{\alpha_j\}_j$ are real-valued parameters representing properties associated with the geometry and/or the overlay comprises the formula $Fo(\hat{T}_1,\ldots,\hat{T}_n; \beta_1,\ldots,\beta_s)$ where, $\hat{T}=\{\hat{T}_j\}_j \subset T$, and $\{\beta_j\}_j$ are real-valued parameters representing properties associated with the overlay, where the variables k, m, r, j, n and s are integers, and wherein $\tilde{T}$ and $\hat{T}$ are data trees T associated with the geometry and overlay, respectively.

14. The data processing apparatus of claim 13 further comprising a display arranged to display the rendered nodes.

15. The apparatus of claim 13 further comprising a memory for storing a plurality of formulae for selection by the user.

16. The apparatus of claim 13 further comprising a transmitter for sending a request for data to an external device and a receiver for receiving this information.

17. The apparatus of claim 16 wherein the transmitter is further arranged to transmit data to the external device.

\* \* \* \* \*